US011005588B1

(12) United States Patent
Xiao

(10) Patent No.: US 11,005,588 B1
(45) Date of Patent: May 11, 2021

(54) WAVELENGTH DIVISION MULTIPLEXING WITH SIGNAL ENTRY AND EXIT IN SAME ROUTING SURFACE TO INCREASE CHANNEL DENSITY

(71) Applicant: ALLIANCE FIBER OPTIC PRODUCTS, INC., Sunnyvale, CA (US)

(72) Inventor: Qijun Xiao, Fremont, CA (US)

(73) Assignee: Alliance Fiber Optic Products, Inc., Sunnyvale, CA (US)

(*) Notice: Subject to any disclaimer, the term of this patent is extended or adjusted under 35 U.S.C. 154(b) by 0 days.

(21) Appl. No.: 16/669,781

(22) Filed: Oct. 31, 2019

(51) Int. Cl.
*H04J 14/02* (2006.01)
*G02B 6/293* (2006.01)
*G02B 6/26* (2006.01)

(52) U.S. Cl.
CPC .......... *H04J 14/0227* (2013.01); *G02B 6/262* (2013.01); *G02B 6/2938* (2013.01)

(58) Field of Classification Search
CPC ....................................... G02B 6/2931–29311
See application file for complete search history.

(56) References Cited

U.S. PATENT DOCUMENTS

| | | | |
|---|---|---|---|
| 8,537,468 B1 | 9/2013 | Wang et al. | |
| 9,794,017 B2 | 10/2017 | O'Daniel | |
| 10,007,065 B2 | 6/2018 | Tan et al. | |
| 2004/0008928 A1* | 1/2004 | Gerken | G02B 27/148 385/24 |
| 2004/0033014 A1* | 2/2004 | Sasaki | G02B 6/2938 385/24 |
| 2008/0166094 A1 | 7/2008 | Bookbinder et al. | |
| 2009/0169163 A1 | 7/2009 | Abbott, III et al. | |
| 2018/0139520 A1 | 5/2018 | Xiao et al. | |

\* cited by examiner

*Primary Examiner* — Nathan M Cors
(74) *Attorney, Agent, or Firm* — Adam R. Weeks

(57) ABSTRACT

Disclosed herein is wavelength-division multiplexing (WDM) and demultiplexing with signal entry and exit in a common routing surface to increase channel density. In particular, disclosed is a WDM assembly including one or more common ports and one or more channel sets, with each channel set including one or more channel ports. The WDM assembly includes a first routing surface with a first WDM passband and a second routing surface offset from the first routing surface. The second routing surface is configured to reflect at least one signal passed through the first routing surface back through the first routing surface at a laterally different location. The offset controls a pitch between reflected signals, while maintaining a sufficiently large surface area to ensure proper signal performance and/or structural integrity. Controlling pitch by offset provides higher density routing with smaller channel pitches and/or more channels in a decreased volume.

19 Claims, 17 Drawing Sheets

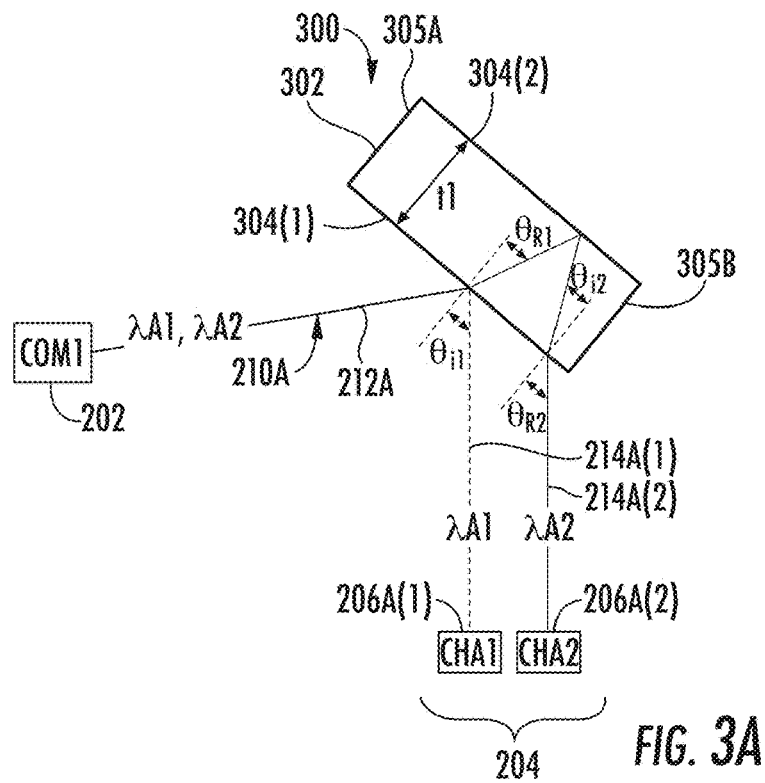
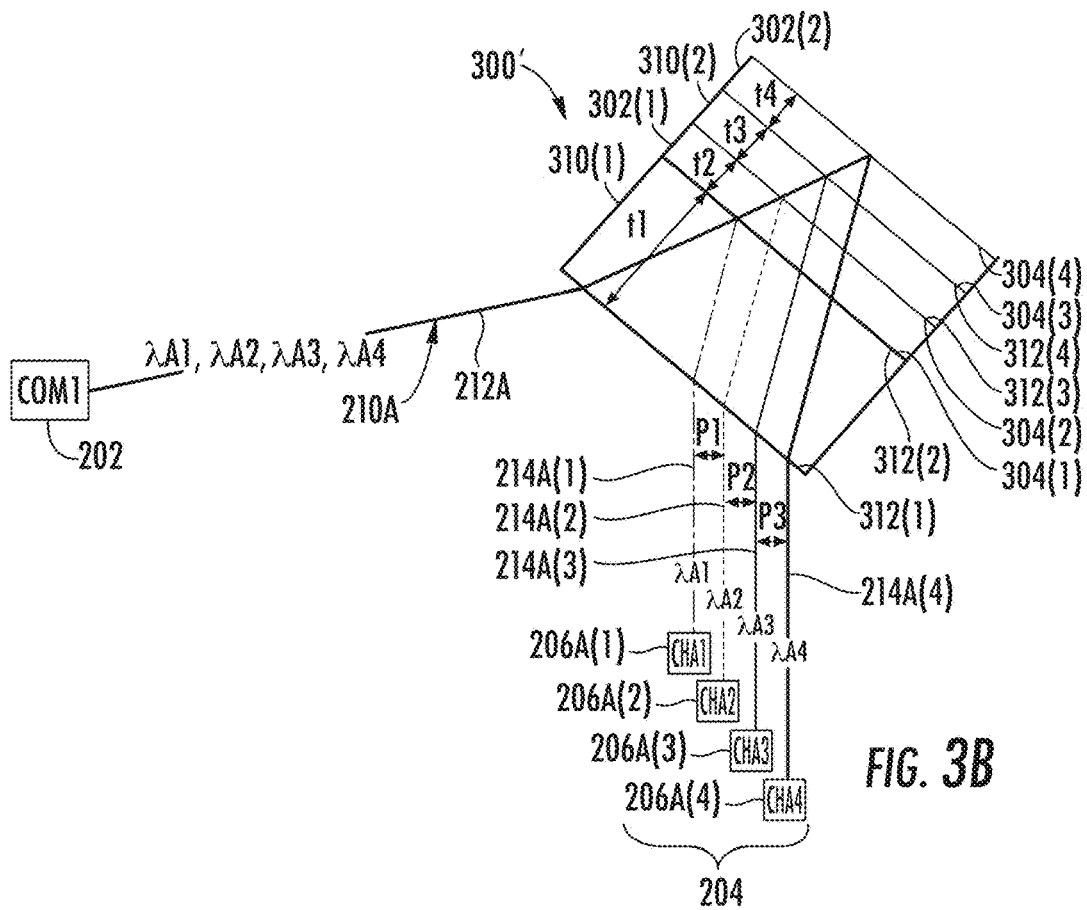
FIG. 3A
FIG. 3B

WAVELENGTH DIVISION MULTIPLEXING WITH SIGNAL ENTRY AND EXIT IN SAME ROUTING SURFACE TO INCREASE CHANNEL DENSITY

BACKGROUND

The disclosure relates to wavelength-division multiplexing (WDM) and demultiplexing, and more particularly, to WDM assemblies with signal entry and exit in a same routing surface for increased channel density.

Wavelength-division multiplexing (WDM) is a technology that multiplexes (e.g., adds) a number of distinct wavelengths of light onto a single optical fiber and demultiplexes (e.g., divides) a number of distinct wavelengths of light from a single optical fiber, thereby increasing information capacity and enabling bi-directional flow of signals. Multiple optical signals are multiplexed with different wavelengths of light combined by a multiplexer at a transmitter, directed to a single fiber for transmission of the signal, and split by a demultiplexer to designated channels at a receiver. By combining multiple channels of light into a single channel, WDM assemblies and associated devices can be used as components in an optical network, such as a passive optical network (PON).

There is an increasing need for faster transceivers, and accordingly, transceivers with more channels (as electronic signal speed cannot increase unlimitedly). Digital signal processing (DSP) and other signal modulation techniques (e.g., 4-level pulse amplitude modulation (PAM4)) may be used to increase the data transfer rate but are extremely costly, especially compared to passive techniques. Such passive techniques include arrayed waveguide grating (AWG) planar lightwave circuit (PLC) and optical thin film filter (TFF) free space wavelength division multiplexing (WDM). Although AWG PLC may be more compact, TFF WDM is superior in loss, passband ripple, passband width, isolation, and thermal stability.

As an example, FIG. 1 is a diagram illustrating a WDM assembly 100 including a single WDM common port 102 in optical communication with a set 104 of four WDM channel ports 106(1)-106(4) by a plurality of WDM filters 108(1)-108(4) and reflective surfaces 110(1)-110(3). The WDM filters 108(1)-108(4) and the reflective surfaces 110(1)-110(3) are arranged to form an optical path 112 between the common port 102 and each of the channel ports 106(1)-106(4). In particular, each of the WDM filters 108(1)-108(4) has a TFF with a unique passband to allow a portion of the optical signal to pass through the WDM filters 108(1)-108(4) and to reflect the remaining portion of the optical signal towards the reflective surfaces 110(1)-110(3), which in turn reflect the remaining portion of the optical signal towards another one of the remaining WDM filters 108(2)-108(4).

The total data transfer rate can be increased by increasing the number of wavelength channels of an optical transceiver, but there is a growing demand to decrease dimensions of the optical transceiver, thereby resulting in significant decreases in the pitch P1-P3 between adjacent channels. However, there are restrictions on decreasing the size of the WDM filters 108(1)-108(4) and/or reflective surfaces 110(1)-110(3). For example, there is a minimum surface area required for proper signal performance (e.g., signals may be negatively affected if too close to an edge of the TFF of a WDM filter 108(1)-108(4) and/or reflective surface 110(1)-110(3)). Further, there is a minimum surface area to apply a TFF to a substrate of a WDM filter 108(1)-108(4) (e.g., 500 microns in a lateral dimension). In other words, there are performance and manufacturing limitations on decreasing the sizes of the WDM filters 108(1)-108(4) and/or reflective surfaces 110(1)-110(3), but there is a need to decrease the pitch P1-P3 between adjacent channels.

SUMMARY

One embodiment of the disclosure relates to a wavelength-division multiplexing (WDM) assembly. The WDM assembly includes a first common port configured for optical communication of a first multiplexed signal including a first demultiplexed signal and a second demultiplexed signal. The WDM assembly further includes a first channel set including a first channel port configured for optical communication of the first demultiplexed signal, and a second channel port configured for optical communication of the second demultiplexed signal. The WDM assembly further includes a first routing surface having a first passband. The first routing surface is configured to reflect the first demultiplexed signal of the first multiplexed signal and pass the second demultiplexed signal of the first multiplexed signal. The WDM assembly further includes at least one second routing surface configured to reflect the second demultiplexed signal of the first multiplexed signal back through the first routing surface, wherein the first common port, the first routing surface, the at least one second routing surface, and the second channel port are configured to define an optical signal path, and wherein the first routing surface is positioned in the optical signal path between the first common port and the at least one second routing surface, and between the at least one second routing surface and the second channel port.

An additional embodiment of the disclosure relates to a wavelength-division multiplexing (WDM) assembly. The WDM assembly includes a housing and a first common collimator positioned within the housing and configured for optical communication of a first multiplexed signal. The first multiplexed signal includes a first demultiplexed signal and a second demultiplexed signal. The WDM assembly further includes a first common fiber optic pigtail coupled to the first common collimator and extending from the housing. The WDM assembly further includes a first channel collimator positioned within the housing and configured for optical communication of the first demultiplexed signal of the first multiplexed signal and a first channel fiber optic pigtail operatively coupled to the first channel collimator and extending from the housing. The WDM assembly further includes a second channel collimator positioned within the housing and configured for optical communication of the second demultiplexed signal of the first multiplexed signal, and a second channel fiber optic pigtail coupled to the second channel collimator and extending from the housing. The WDM assembly further includes a first routing surface having a first passband. The first routing surface is configured to reflect the first demultiplexed signal of the first multiplexed signal and pass the second demultiplexed signal of the first multiplexed signal. The WDM assembly further includes at least one second routing surface configured to reflect the second demultiplexed signal of the first multiplexed signal back through the first routing surface, wherein the first common collimator, the first routing surface, the at least one second routing surface, and the second channel collimator are configured to define an optical signal path, and wherein the first routing surface is positioned in the optical signal path between the first common collimator and the at least one second routing surface and between the at least one second routing surface and the second channel collimator.

An additional embodiment of the disclosure relates to a method of using a wavelength-division multiplexing (WDM) assembly. The method includes propagating, from a first common port, a first multiplexed signal including a first demultiplexed signal and a second demultiplexed signal. The method further includes reflecting the first demultiplexed signal of the first multiplexed signal off a first routing surface having a first passband so that the first multiplexed signal is directed to a first channel set including a first channel port. The method further includes passing the second demultiplexed signal of the first multiplexed signal through the first routing surface. The method further includes reflecting, off at least one second routing surface, the second demultiplexed signal that was passed through the first routing surface. The method further includes passing the second demultiplexed signal reflected from the at least one second routing surface through the first routing surface to a second channel port.

Additional features and advantages will be set out in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 3A is a top view of another embodiment of the WDM assembly of FIGS. 2A-2B including a WDM filter with the first routing surface and the second routing surface opposite thereto;

FIG. 3B is a top view of another embodiment of a WDM assembly including the WDM filter of FIG. 3A;

DETAILED DESCRIPTION

Figure 1:
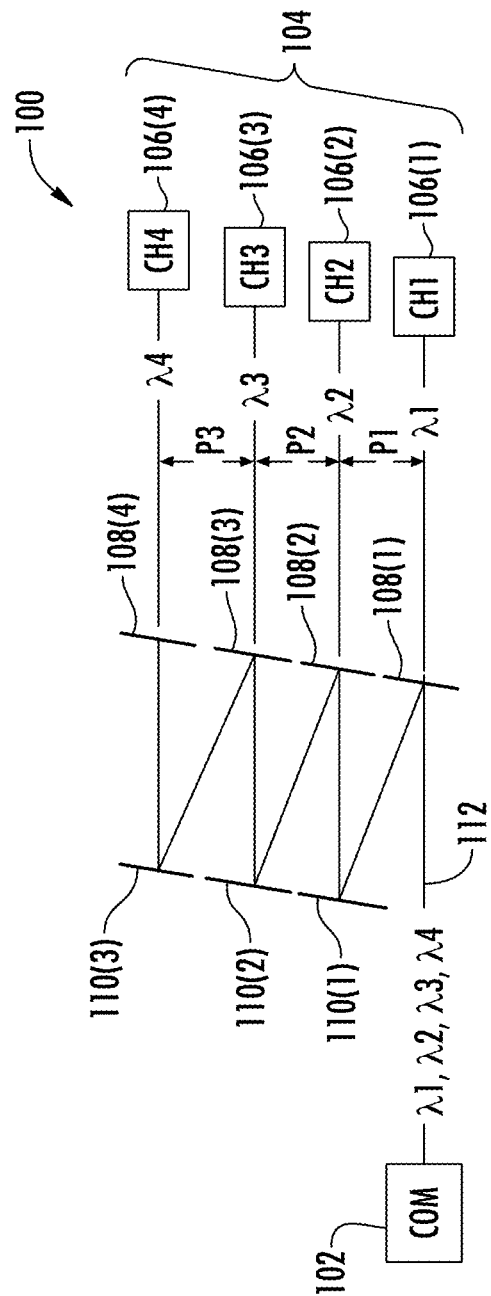
FIG. 1 is a diagram of a wavelength-divisional multiplexing (WDM) optical assembly including a single WDM common port in optical communication with four WDM channel ports via four WDM filters.

Reference will now be made in detail to the present preferred embodiments, examples of which are illustrated in the accompanying drawings. Whenever possible, the same reference numerals will be used throughout the drawings to refer to the same or like parts.

The embodiments set out below represent the information to enable those skilled in the art to practice the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

REFERENCE NUMBERS AND TERMINOLOGY

The use herein of ordinals in conjunction with an element is solely for distinguishing what might otherwise be similar or identical labels, such as "first layer" and "second layer," and does not imply a priority, a type, an importance, or other attribute, unless otherwise stated herein.

The term "about" used herein in conjunction with a numeric value means any value that is within a range of ten percent greater than or ten percent less than the numeric value.

As used herein, the articles "a" and "an" in reference to an element refers to "one or more" of the element unless otherwise explicitly specified. The word "or" as used herein is inclusive unless contextually impossible. As an example, the recitation of A or B means A, or B, or both A and B.

The phrase "surface" as used herein refers to an outermost portion of an item, and includes a thickness of the outermost portion of the item. The precise thickness is generally not relevant to the embodiments, unless otherwise discussed herein. For example, a layer of material has a surface which includes the outermost portion of the layer of material as well as some depth into the layer of material, and the depth may be relatively shallow, or may extend substantially into the layer of material. To this end, surfaces in this disclosure may be defined by a layer of material, particularly when surfaces are described as having an associated passband for optical signals. It will be appreciated that a thin film filter (TFF) formed using thin-film deposition techniques known in the art may define "routing surfaces" referred to in this disclosure. As is known, a TFF can be formed from layers of dielectric and/or semi-metallic materials of different refractive indices deposited on a glass or polymer substrate.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The use herein of "proximate" means at, next to, or near.

The terms "left," "right," "top," "bottom," "front," "back," "horizontal," "parallel," "perpendicular," "vertical," "lateral," "coplanar," and similar terms are used for convenience of describing the attached figures and are not intended to limit this disclosure. For example, the terms "left side" and "right side" are used with specific reference to the drawings as illustrated and the embodiments may be in other orientations in use. Further, as used herein, the terms "horizontal," "parallel," "perpendicular," "vertical," "lateral," etc., include slight variations that may be present in working examples.

As used herein, the terms "optical communication," "in optical communication," and the like mean that two elements are arranged such that optical signals are passively or actively transmittable therebetween via a medium, such as, but not limited to, an optical fiber, connectors, free space, index-matching structure or gel, reflective surface, or other light directing or transmitting means.

As used herein, the term "port" means an interface for actively or passively passing (e.g., receiving, transmitting, or both receiving and transmitting) optical signals. A port may include, by way of non-limiting examples, one or more collimators, pigtails, optical connectors, optical splices, optical fibers, free-space, or a combination of the foregoing. In the context of a WDM assembly, a port is the location at which one or more optical signals enters and/or exist the WDM assembly.

As used herein, the term "pigtail" means one or more optical fibers that extend from a ferrule. The one or more optical fibers may each be terminated with a fiber optical connector but are not required to be terminated with a fiber optic connector.

WDM Assemblies

Disclosed herein is wavelength-division multiplexing (WDM) and demultiplexing with signal entry and exit in a common/shared routing surface to increase channel density. That is, signal entry and exit occurs in the same routing surface. In particular, disclosed is a WDM assembly including one or more common ports and one or more channel sets, with each channel set including one or more channel ports. The WDM assembly further includes a first routing surface with a first WDM passband and a second routing surface (e.g., with a second WDM passband or a reflective surface) offset from the first routing surface. The second routing surface is configured to reflect at least one signal passed through the first routing surface back through the first routing surface at a laterally different location. The offset between the first routing surface and the second routing surface controls a pitch between signals reflected from the first routing surface and the second routing surface, while maintaining a sufficiently large surface area to ensure proper signal performance and/or structural integrity. Controlling pitch by offset provides higher density routing with smaller channel pitches and/or more channels in a decreased volume. Additionally, the embodiments disclosed herein are easy to manufacture and low cost.

Figure 2A:
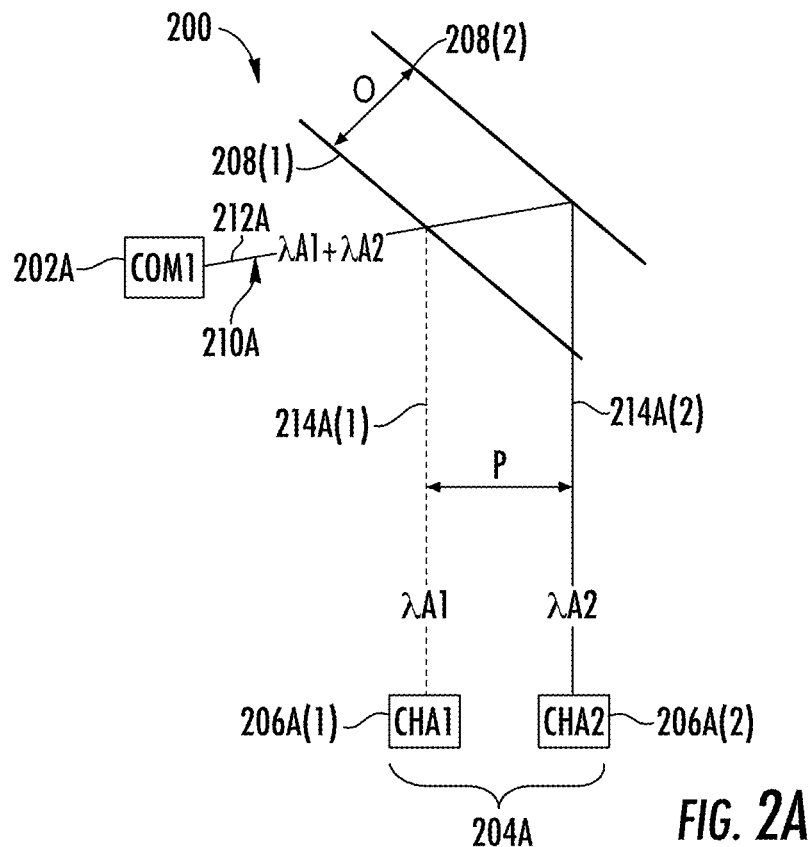
FIG. 2A is a diagram of a WDM assembly of the present application including a first routing surface and a second routing surface offset therefrom to have a signal enter and exit in the same first routing surface in a laterally different location.
Figure 2B:
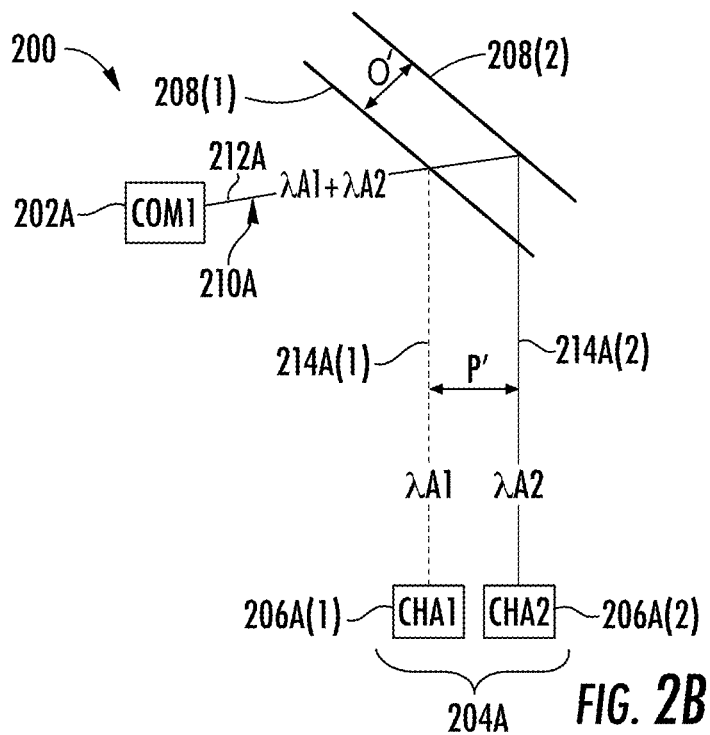
FIG. 2B is a top view of the WDM assembly of FIG. 2A with a different offset and corresponding different pitch between adjacent channel paths.

FIGS. 2A-2B are views of embodiments of a WDM assembly 200 (may also be referred to as a WDM optical assembly). In particular, FIG. 2A is a diagram of a WDM assembly 200 including a first WDM common port 202A (may be referred to generally as common port 202) in optical communication with a first channel set 204A (may be referred to generally as channel set 204) of two WDM channel ports 206A(1)-206A(2) (each may be referred to generally as a channel port 206) by a plurality of routing surfaces 208(1)-208(2) (each may be referred to generally as a routing surface 208). The first common port 202A is configured for optical communication of a first multiplexed signal including a first signal $\lambda A1$ and a second signal $\lambda A2$. Thus, the first multiplexed signal may be denoted as $\lambda A1+\lambda A2$ or $\lambda A1-\lambda A2$ (with the "−" meaning "through"). It is noted that $\lambda A1$ and $\lambda A2$ do not necessarily represent single wavelengths; instead they can be groups of wavelengths which can be selectively passed/reflected by thin film filter (TFF) wavelength-division multiplexing. Because ultimately the first signal $\lambda A1$ and the second signal $\lambda A1$ can be demultiplexed, and such demultiplexing is the intent of WDM assemblies according to this disclosure, the first signal $\lambda A1$ and the second signal $\lambda A1$ may alternatively be referred to respectively as a "first demultiplexed signal $\lambda A1$" and a "second demultiplexed signal $\lambda A1$." This terminology may be used for convenience even when the first signal $\lambda A1$ and the second signal $\lambda A1$ are transmitted in a multiplexed form, i.e. as the first multiplexed signal $\lambda A1+\lambda A2$.

Still referring to FIGS. 2A-2B, the first channel port 206A(1) of the first channel set 204A is configured for optical communication of the first demultiplexed signal $\lambda A1$, and the second channel port 206A(2) of the first channel set 204A is configured for optical communication of the second demultiplexed signal λA2. The WDM assembly 200 includes a single common port 202A, a single channel set 204 (in the form of the first channel set 204A), and two channel ports 206A(1)-206A(2) for illustrative purposes. In other embodiments, the WDM assembly 200 may include additional common ports 202, channel sets 204, and/or channel ports 206(1)-206(2).

The routing surfaces 208(1)-208(2) form or otherwise define an optical path 210A (may be referred to generally as optical path 210) between the common port 202A and each of the channel ports 206A(1)-206A(2). In particular, the first routing surface 208(1) has a unique passband (e.g., via a WDM coating such as a thin film filter) to allow a portion of the optical signal to pass therethrough (e.g., the second demultiplexed signal λA2) at an entry lateral location and to reflect the remaining portion of the optical signal (e.g., the first demultiplexed signal λA1) at the entry lateral location. In certain embodiments, the passband comprises short-pass, long-pass, and/or band-pass passbands. The second routing surface 208(2) (e.g., a second passband and/or a mirror) is configured to reflect the second demultiplexed signal λA2 back through the first routing surface 208(1) at an exit lateral location (different from the entry lateral location) of the first routing surface 208(1). It is noted that here and throughout the disclosure, in certain embodiments, the optical signal path 210A is bidirectional between the common port 202A and the channel ports 206A(1)-206A(2).

The optical signal path 210A includes a common port path 212A between the first common port 202A and the first routing surface 208(1), a first channel path 214A(1) between the first routing surface 208(1) and the first channel port 206A(1), and a second channel path 214A(2) between the second routing surface 208(2) and the second channel port 206A(2). The first channel path 214A(1) and the second channel path 214A(2) are generally parallel to each other (i.e., the pitch P between the first channel path 214A(1) and the second channel path 214A(2) is constant from the first routing surface 208(1)). In certain embodiments the pitch P could be 87 microns or less. It is noted that here and throughout, in certain embodiments, the channel paths 214A(1)-214A(2) may be embodied as lanes (e.g., straight lanes).

The optical signal path 210A of the second demultiplexed signal λA2 is defined by the first common port 202A, the first routing surface 208(1), the at least one second routing surface 208(2), and the second channel port 206A(2). The first routing surface 208(1) is positioned in the optical signal path 210A between the first common port 202A and the at least one second routing surface 208(2) and between the at least one second routing surface 208(2) and the second channel port 206A(2). The second routing surface 208(2) is offset from the first routing surface 208(1) by an offset O, which corresponds to a pitch P between the first channel path 214A(1) and the second channel path 214A(2).

Referring to FIG. 2B, as an example, a different offset O' corresponds to a different pitch P' between adjacent channel paths 214A(1)-214A(2). As the offset O' decreases, the pitch P' also decreases. In this way, the offset O' between the first routing surface 208(1) and the second routing surface 208(2) controls a pitch P' between channel paths 214A(1)-214A(2) and corresponding signals reflected from the first routing surface 208(1) and the second routing surface 208(2), while maintaining a sufficiently large surface area to ensure proper signal performance and/or structural integrity. Controlling pitch by offset provides higher density routing with smaller channel pitches and/or more channels in a decreased volume.

FIG. 3A is a top view of another embodiment of the WDM assembly of FIGS. 2A-2B. The WDM assembly 300 includes a WDM filter 302 with the first routing surface 304(1) (may also be referred to as a front surface) at a front of the WDM filter 302, the second routing surface 304(2) (may also be referred to as a back surface) opposite thereto at a back of the WDM filter 302, and lateral sides 305A-305B extending between the first routing surface 304(1) and the second routing surface 304(2). The first routing surface 304(1) has a first unique passband to allow a portion of the optical signal to pass therethrough (e.g., the second demultiplexed signal λA2) and to reflect the remaining portion (e.g., the first demultiplexed signal λA1). The second routing surface 304(2) has a second unique passband to reflect the optical signal that passed through the first routing surface 304(1) (e.g., the second demultiplexed signal λA2). However, in certain embodiments, the second routing surface 304(2) instead includes a reflective surface of a mirror.

The angle of incidence θi1 of the first multiplexed signal λA1-λA2 is the same as the angle of refraction θR2 of the second demultiplexed signal λA2 exiting the first routing surface 304(1), and the angle of refraction θR1 of the second demultiplexed signal λA2 entering the first routing surface 304(1) is the same as the angle of incidence θi2 of the second demultiplexed signal λA2 exiting the first routing surface 304(1). Accordingly, the first channel path 214A(1) and the second channel path 214A(2) are generally parallel to each other from the first routing surface 304(1) to the respective channel ports 206A(1)-206A(2) (i.e., the pitch between the first channel path 214A(1) and the second channel path 214A(2) is constant).

As similarly noted above, the second routing surface 304(2) is offset from the first routing surface 304(1) by a thickness t1, which determines the pitch P (FIG. 2A) between the first channel path 214A(1) and the second channel path 214A(2). As the thickness t1 decreases, the pitch P also decreases. Thus, the pitch P between adjacent channels can be altered by changing the thickness of the WDM filter 302 (i.e., between the first routing surface 304(1) and the second routing surface 304(2)) rather than the width of the WDM filter 302 (i.e., between lateral sides 305A-305B), which maintains a sufficiently large surface area to ensure proper signal performance and/or structural integrity. In certain embodiments, the thickness t1 of the WDM filter 302 is determined by filter base material index of refraction and optical beam angle of incidence θi1.

FIG. 3B is a top view of another embodiment of a WDM assembly 300' including the WDM filter 302 of FIG. 3A. The WDM assembly 300' includes a first WDM common port 202 in optical communication with a channel set 204 of four WDM channel ports 206A(1)-206A(4) by a plurality of routing surfaces 304(1)-304(4) of the WDM assembly 300'. The first WDM common port 202 is configured for optical communication of a first multiplexed signal including a first demultiplexed signal λA1, a second demultiplexed signal λA2, a third demultiplexed signal λA3, and a fourth demultiplexed signal λA4. Thus, the first multiplexed signal in this embodiment may be denoted as λA1+λA2+λA3+λA4, or simply λA1-λA4 (with the "-" meaning "through"). The first channel port 206A(1) is configured for optical communication of the first demultiplexed signal λA1. The second channel port 206A(2) is configured for optical communication of the second demultiplexed signal λA2. The third channel port 206A(3) is configured for optical communication of the third demultiplexed signal λA3. The fourth channel port 206(4) is configured for optical communication of the fourth demultiplexed signal λA4.

The WDM assembly 300' includes a plurality of filters 302(1)-302(2) and/or substrates 310(1)-310(2) in a stacked orientation (may be referred to herein as a filter stack, optical subassembly, routing subassembly, WDM subassembly, etc.). The WDM assembly 300' includes a first support substrate 310(1) having a first transmissive surface 312(1) and a second transmissive surface 312(2) opposite thereto. The first transmissive surface 312(1) is configured to pass the first multiplexed signal λA1–λA4 at a refracted angle to the second transmissive surface 312(2) which is also configured to pass the first multiplexed signal λA1–λA4. In certain embodiments, the first transmissive surface 312(1) includes an anti-reflective coating. It is noted that throughout the specification, any transmissive surface may include an anti-reflective coating and any routing surface may include a WDM coating (e.g., a thin film filter).

The WDM assembly 300' further includes a first WDM filter 302(1) including a first routing surface 304(1) including a first unique passband and a second routing surface 304(2) opposite thereto including a second unique passband. The first routing surface 304(1) is proximate (e.g., contacting) the second transmissive surface 312(2) of the first support substrate 310(1). The first routing surface 304(1) is configured to reflect the first demultiplexed signal λA1 and pass the second, third, and fourth demultiplexed signals λA2–λA4. The reflected first demultiplexed signal λA1 proceeds back through the first transmissive surface 312(1) of the first support substrate 310(1). The second routing surface 304(2) is configured to reflect the second demultiplexed signal λA2 and pass the third and fourth demultiplexed signals λA3–λA4. The reflected second demultiplexed signal λA2 proceeds back through the first routing surface 304(1) and the first transmissive surface 312(1), exiting each surface at a different lateral location than entry.

The WDM assembly 300' further includes a second support substrate 310(2) including a third transmissive surface 312(3) and a fourth transmissive surface 312(4) opposite thereto. The third and fourth transmissive surfaces 312(3)-312(4) are configured to pass the third and fourth demultiplexed signals λA3–λA4.

The WDM assembly 300' further includes a second WDM filter 302(2) including a third routing surface 304(3) including a third unique passband and a fourth routing surface 304(4) opposite thereto including a fourth unique passband. The third routing surface 304(3) is proximate (e.g., contacting) the third transmissive surface 312(3) of the second support substrate 310(2). The third routing surface 304(3) is configured to reflect the third demultiplexed signal λA3 and pass the fourth demultiplexed signal λA4. The reflected third demultiplexed signal λA3 proceeds back through the second routing surface 304(2), first routing surface 304(1), and first transmissive surface 312(1) of the first support substrate 310(1). The fourth routing surface 304(4) is configured to reflect the fourth demultiplexed signal λA4. The reflected fourth demultiplexed signal λA4 proceeds back through the third routing surface, 304(3), second routing surface 304(2), first routing surface 304(1), and the first transmissive surface 312(1), exiting each surface at a different lateral location than entry.

Each of the demultiplexed signals λA1–λA4 proceeds from the first transmissive surface 312(1) along their respective channel path 214A(1)-214A(4) to their respective channel port 206A(1)-206A(4). It is noted that the thickness t1 of the first support substrate does not affect the pitch between the channel paths 214A(1)-214A(4). Instead, the pitch P1 between the first channel path 214A(1) and the second channel path 214A(2) is determined by a thickness t2 of the first WDM filter 302(1). The pitch P2 between the second channel path 214A(2) and the third channel path 214A(3) is determined by a thickness t3 of the second support substrate 310(2). The pitch P3 between the third channel path 214A(3) and the fourth channel path 214A(4) is determined by a thickness t4 of the second WDM filter 302(2).

Figure 4A:
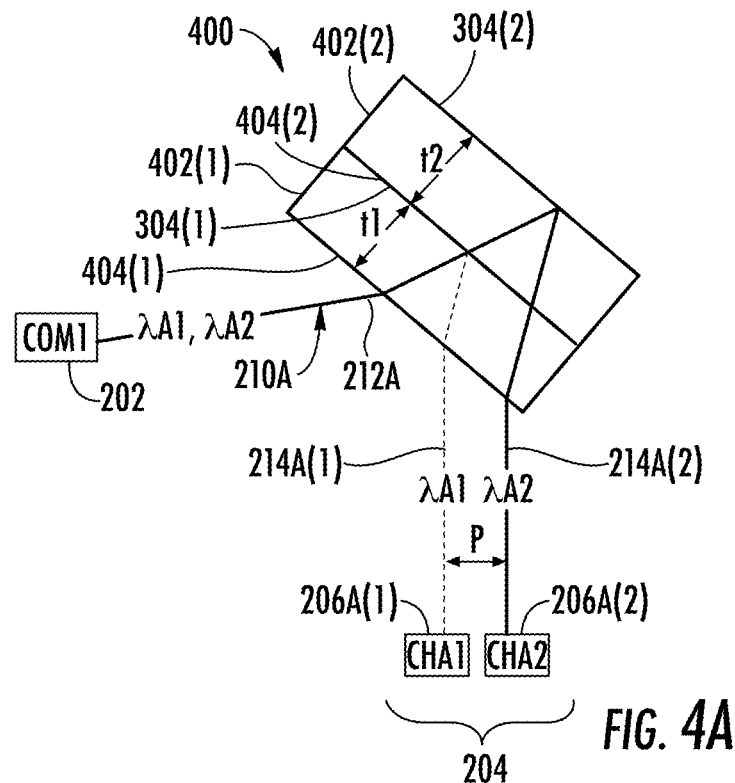
FIG. 4A is a top view of another embodiment of the WDM assembly of FIGS. 2A-2B including the first routing surface at a back of a first WDM filter and the second routing surface at a back of a second WDM filter.

FIG. 4A is a top view of another embodiment of the WDM assembly of FIGS. 2A-2B. The WDM assembly 400 includes a first WDM filter 402(1) having a thickness t1 and a second WDM filter 402(2) having a thickness t2. The first WDM filter 402(1) includes a first transmissive surface 404(1) at a front and a first routing surface 304(1) at a back opposite thereto. The first transmissive surface 404(1) is positioned in the optical signal path 210 between the first common port 202 and the first routing surface 304(1). In certain embodiments, the first transmissive surface 404(1) includes an anti-reflective coating. Similarly, the second WDM filter 402(2) includes a second transmissive surface 404(2) at a front and a second routing surface 304(2) at a back opposite thereto. The second transmissive surface 404(2) of the second WDM filter 402(2) is positioned proximate the first routing surface 304(1) of the first WDM filter 402(1).

Figure 4B:
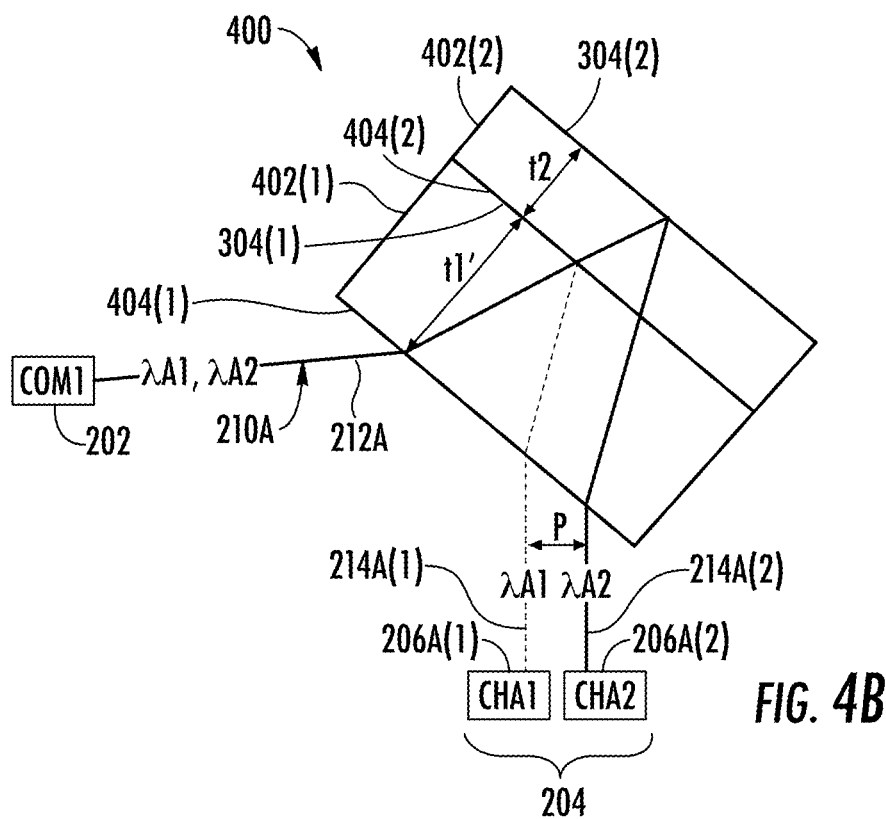
FIG. 4B is a top view of the WDM filters of FIG. 4A illustrating constant signal pitch with a different thickness of the first WDM filter.

FIG. 4B is a top view of the WDM filters of FIG. 4A illustrating constant signal pitch P with a different thickness t1' of the first WDM filter 402(1). The thickness t1' of the first WDM filter 402(1) between the first transmissive surface 404(1) and the first routing surface 304(1) is greater than the thickness t2 of the second WDM filter 402(2) between the second transmissive surface 404(2) and the second routing surface 304(2). As shown, increasing the thickness of the first WDM filter 402(1) laterally shifts the first and second channel paths 214A(1)-214A(2) but does not affect the pitch P between them.

Figure 4C:
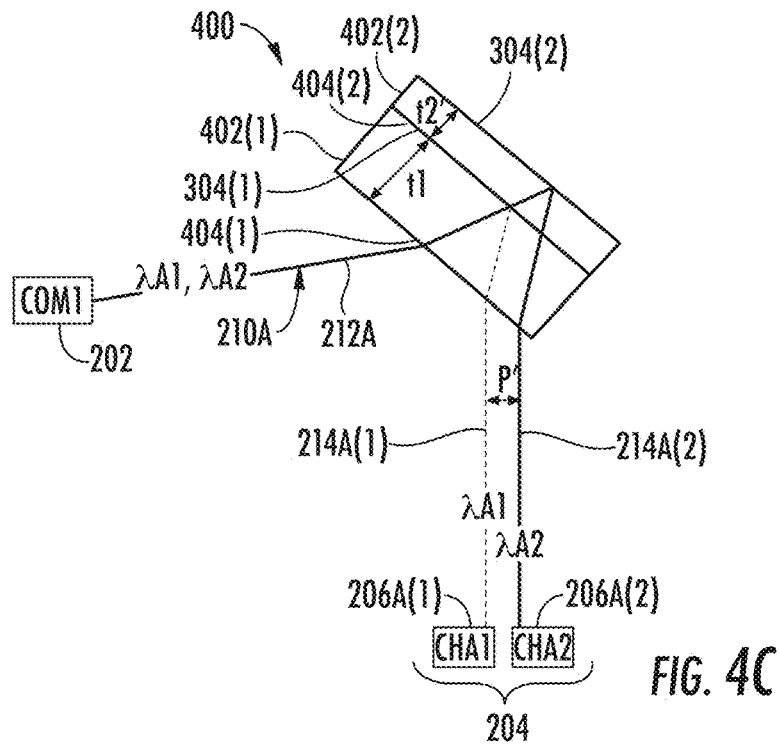
FIG. 4C is a top view of the WDM filters of FIG. 4A illustrating a different signal pitch with a different thickness of the second WDM filter.

FIG. 4C is a top view of the WDM filters of FIG. 4A illustrating a different signal pitch P' with a different thickness t2' of the second WDM filter 402(2). The thickness t2' of the first WDM filter 402(1) between the first transmissive surface 404(1) and the first routing surface 304(1) is decreased compared to FIG. 4A. As shown, decreasing (or otherwise changing) the thickness t2' of the second WDM filter 402(2) does not laterally shift the first channel path 214A(1) but does laterally shift the second channel path 214A(2) to decrease (or otherwise change) the pitch P between them. In other words, a pitch P' between the signal paths of the first demultiplexed signal λA1 and the second demultiplexed signal λA2 exiting the first routing surface 304(1) is defined by the thickness t2' of the second WDM filter 402(2).

Figure 4D:
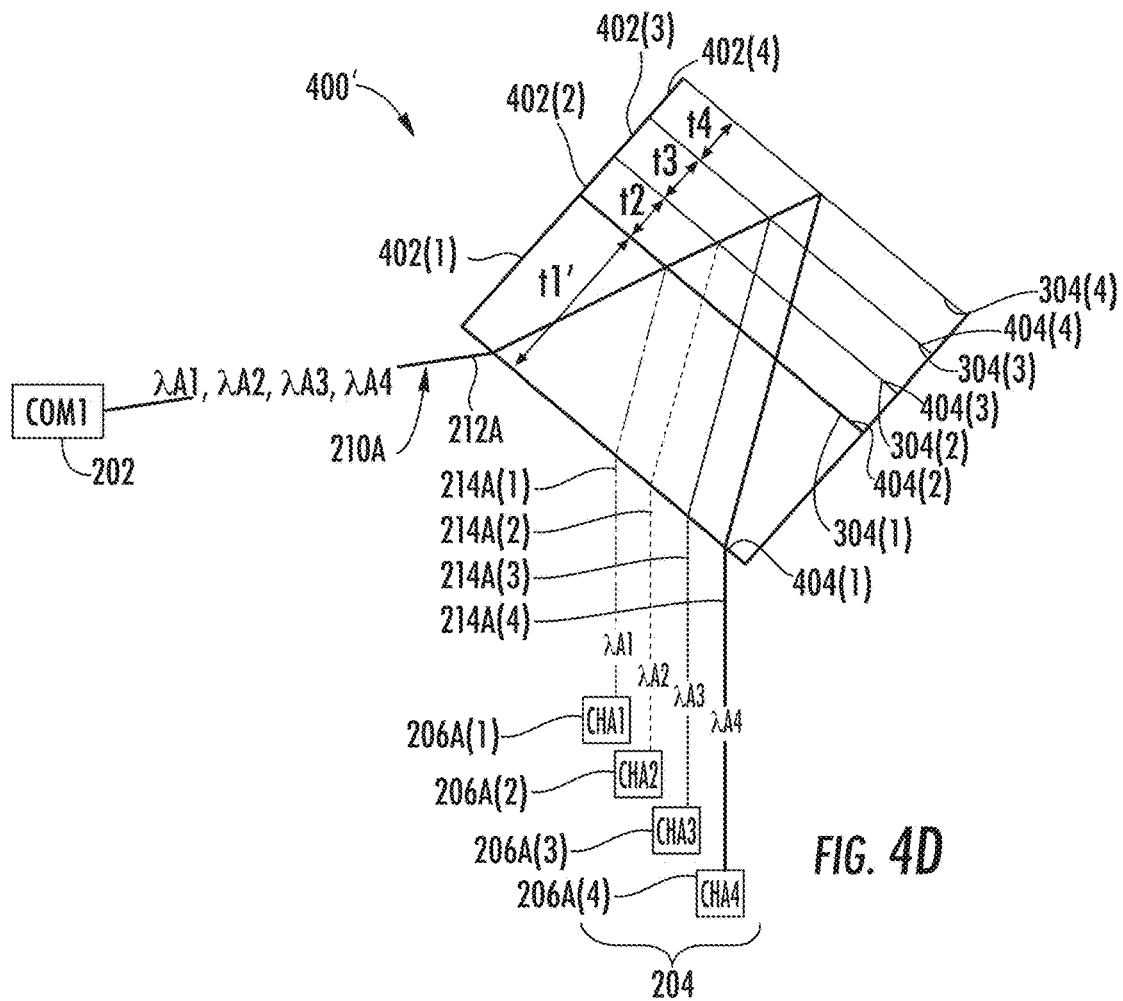
FIG. 4D is a top view of another embodiment of the WDM assembly including the WDM filters of FIGS. 4A-4C.

FIG. 4D is a top view of another embodiment of the WDM assembly including the WDM filters of FIGS. 4A-4C. The WDM assembly 400' is similar to the WDM assembly 300' of FIG. 3B except where otherwise noted. The WDM assembly 400' includes a plurality of filters 402(1)-402(4) (and no support substrate) in a stacked orientation. In particular, the WDM assembly 400 includes a plurality of WDM filters 402(1)-402(4), each with a transmissive surface 404(1)-404(4) at a front and a routing surface 304(1)-304(2) at a back opposite thereto.

The first routing surface 304(1) of the first WDM filter 402(1) is proximate (e.g., contacting) the second transmissive surface 404(2) of the second WDM filter 402(2). The reflected first demultiplexed signal λA1 reflected by the first routing surface 304(1) proceeds back through the first transmissive surface 404(1) of the first WDM filter 402(1), exiting at a different lateral location than entry.

The second routing surface 304(2) of the second WDM filter 402(2) is proximate (e.g., contacting) the third transmissive surface 404(3) of the third WDM filter 402(3). The reflected second demultiplexed signal λA2 reflected by the first routing surface 304(1) proceeds back through the first WDM filter 402(1) (i.e., the first routing surface 304(1) and the first transmissive surface 404(1)) exiting the first WDM filter 402(1) at a different lateral location than entry.

The third routing surface 304(3) of the third WDM filter 402(3) is proximate (e.g., contacting) the fourth transmissive surface 404(4) of the fourth WDM filter 402(4). The reflected third demultiplexed signal λA3 reflected by the first routing surface 304(1) proceeds back through the second WDM filter 402(2) (i.e., the second routing surface 304(2) and the second transmissive surface 404(2)) and the first WDM filter 402(1) (i.e., the first routing surface 304(1) and the first transmissive surface 404(1)) exiting each WDM filter 402(1)-402(2) at a different lateral location than entry.

The fourth demultiplexed signal λA4 reflected by the fourth routing surface 304(4) proceeds back through the third WDM filter 402(3) (i.e., the third routing surface 304(3) and the third transmissive surface 404(3)), the second WDM filter 402(2) (i.e., the second routing surface 304(2) and the second transmissive surface 404(2)), and the first WDM filter 402(1) (i.e., the first routing surface 304(1) and the first transmissive surface 404(1)) exiting each WDM filter 402(1)-402(3) at a different lateral location than entry.

Each of the demultiplexed signals λA1–λA4 proceeds from the first transmissive surface 404(1) of the first WDM filter 402(1) along their respective channel path 214A(1)-214A(4) to their respective channel port 206A(1)-206A(4). It is noted that the thickness t1' of the first WDM filter 402(1) does not affect the pitch between the channel paths 214(1)-214(4). Accordingly, the thickness t1' of the first WDM filter 402(1) can be increased to act as a supporting substrate to the remaining WDM filters 402(2)-402(4). The pitch P1 between the first channel path 214(1) and the second channel path 214A(2) is determined by a thickness t2 of the second WDM filter 402(2). The pitch P2 between the second channel path 214A(2) and the third channel path 214(3) is determined by a thickness t3 of the third WDM filter 402(3). The pitch P3 between the third channel path 214(3) and the fourth channel path 214(4) is determined by a thickness t4 of the fourth WDM filter 402(4).

Figure 5:
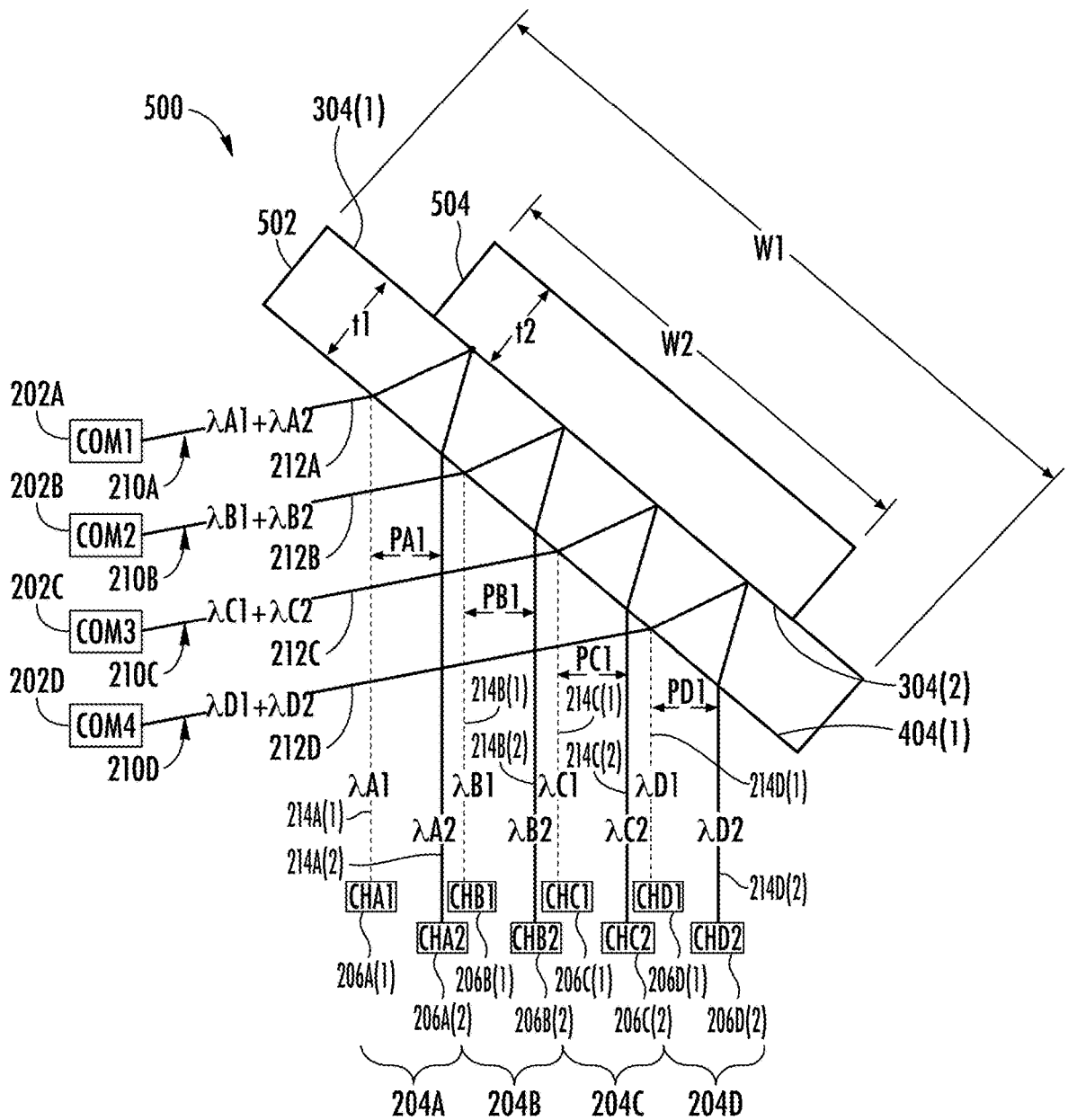
FIG. 5 is a top view of another embodiment of the WDM assembly of FIGS. 2A-2B with the first routing surface at a front of a first WDM filter and the second routing surface at a front of a mirror.

FIG. 5 is a top view of another embodiment of the WDM assembly of FIGS. 2A-2B. The WDM assembly 500 includes multiple common ports 202A-202D including a first common port 202A, a second common port 202B, a third common port 202C, and a fourth common port 202D in optical communication with, respectively, a first channel set 204A of two WDM channel ports 206A(1)-206A(2), a second channel set 204B of two WDM channel ports 206B(1)-206B(2), a third channel set 204C of two WDM channel ports 206C(1)-206C(2), and a fourth channel set 204D of two WDM channel ports 206D(1)-206D(2).

The first WDM common port 202A is configured for optical communication with a first channel set 204A of two WDM channel ports 206A(1)-206A(2). The first common port 202A is configured for optical communication of a first multiplexed signal λA1+λA2 including a first demultiplexed signal λA1 and a second demultiplexed signal λA2. The second WDM common port 202B is configured for optical communication with a second channel set 204B of two WDM channel ports 206B(1)-206B(2). The second common port 202B is configured for optical communication of a second multiplexed signal λB1–λB2 including a first demultiplexed signal λB1 and a second demultiplexed signal λB2.

The third WDM common port 202C is configured for optical communication with a third channel set 204C of two WDM channel ports 206C(1)-206C(2). The third common port 202C is configured for optical communication of a third multiplexed signal λC1+λC2 including a first demultiplexed signal λC1 and a second demultiplexed signal λC2. The fourth WDM common port 202D is configured for optical communication with a fourth channel set 204D of two WDM channel ports 206D(1)-206D(2). The fourth common port 202D is configured for optical communication of a fourth multiplexed signal λD1+λD2 including a first demultiplexed signal λD1 and a second demultiplexed signal λD2.

The WDM assembly 500 includes a WDM filter 502 having a first routing surface 304(1) at a front and a first transmissive surface 404(1) at a back opposite thereto. The WDM assembly 500 further includes a mirror 504 having a second routing surface 304(2) at a front. It is noted that in certain embodiments, the WDM assembly includes a second WDM filter instead of a mirror 504. The second routing surface 304(2) of the mirror 504 is proximate (e.g., contacting) the first transmissive surface 404(1) of the WDM filter 502. The first routing surface 304(1) is positioned in the optical signal paths 210A-210D between the common ports 202A-202D and the first transmissive surface 404(1). The first routing surface 304(1) is configured to reflect the first demultiplexed signal λA1–λD1 of each multiplexed signal. The second routing surface 304(2) is configured to reflect the second demultiplexed signal λA2–λD2 of each multiplexed signal through the first routing surface 304(1).

Each of the optical signal paths 210A-210D enter the same first routing surface 304(1) at a different lateral location, and are reflected by the same mirror 504 at a different lateral location. Accordingly, the width W1 of the first WDM filter 502 and/or the width W2 of the mirror 504 can be shortened or extended to accommodate any number of common ports. As shown, the width W1 of the first WDM filter 502 can be a different size (e.g., larger) than the width W2 of the mirror 504. It is noted that the mirror 504 could be one large mirror 504 (as shown) or individual mirror elements.

With multiple common ports 202A-202D, the thickness t2 of the mirror 504 controls the pitch PA1 between the first channel path 214A(1) and the second channel path 214A(2) of the first channel set 204A, but also between the second channel path 214A(2) of the first channel set 204A and the first channel path 214B(1) of the second channel set 204B. In other words, as the thickness t2 of the mirror 504 changes the first channel paths 214A(1)-214D(1) to remain stationary, but the position of the second channel paths 214A(2)-214D(2) laterally shifts in between the first channel paths 214A(1)-214D(1).

Figure 6A:
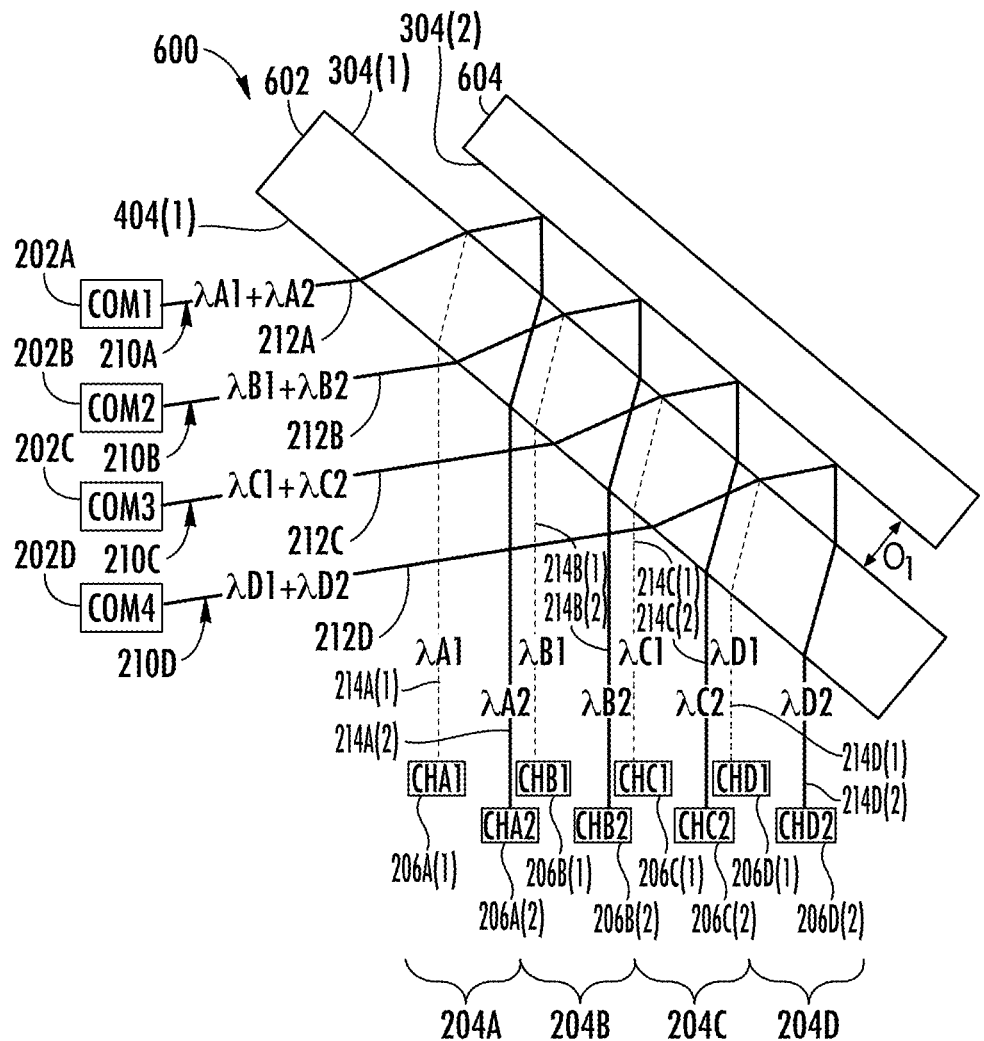
FIG. 6A is a top view of another embodiment of the WDM assembly of FIGS. 2A-2B with the first routing surface at a back of a first WDM filter and the second routing surface at a front of a routing component and offset from the back of the first WDM filter.

FIG. 6A is a top view of another embodiment of the WDM assembly of FIGS. 2A-2B. The WDM assembly 600 includes multiple common ports 202A-202D in optical communication with, respectively, channel sets 204A-204D. The WDM assembly 600 includes a WDM filter 602 having a first transmissive surface 404(1) at a front and a first routing surface 304(1) at a back opposite thereto.

The WDM assembly 600 further includes a mirror 604 having a second routing surface 304(2) at a front. It is noted that in certain embodiments, the WDM assembly 600 includes a second WDM filter instead of a mirror 604. The second routing surface 304(2) of the mirror 604 is proximate (e.g., contacting) but offset by a thickness O1 from the first routing surface 304(1) of the WDM filter 602. The first transmissive surface 404(1) is positioned in the optical signal paths 210A-210D between the common ports 202A-

202D and the first routing surface 304(1). The first routing surface 304(1) is configured to reflect the first demultiplexed signal λA1–λD1 of each multiplexed signal. The second routing surface 304(2) is configured to reflect the second demultiplexed signal λA2–λD2 of each multiplexed signal through the first routing surface 304(1).

Each of the optical signal paths 210A-210D enter the same first routing surface 304(1) at a different lateral location, and are reflected by the same mirror 604 at a different lateral location. The mirror 604 could be one large mirror 604 (as shown) or individual mirror elements. Even though the mirror 604 is offset and does not directly contact the first WDM filter 602, because the first routing surface 304(1) is generally parallel with the second routing surface 304(2) and the reflected signal path proceeds back through the first WDM filter 602, the channel paths 214A(1)-214D(2) are generally parallel with one another upon exiting the first WDM filter 602. Further, this offset O1 enables active precise optical alignment optimization because for extremely small pitches it may be more challenging to control the critical thickness of a WDM filter than to control relative spacing between the first WDM filter 602 and the second routing surface 304(2) (of a mirror or a second WDM filter).

Figure 6B:
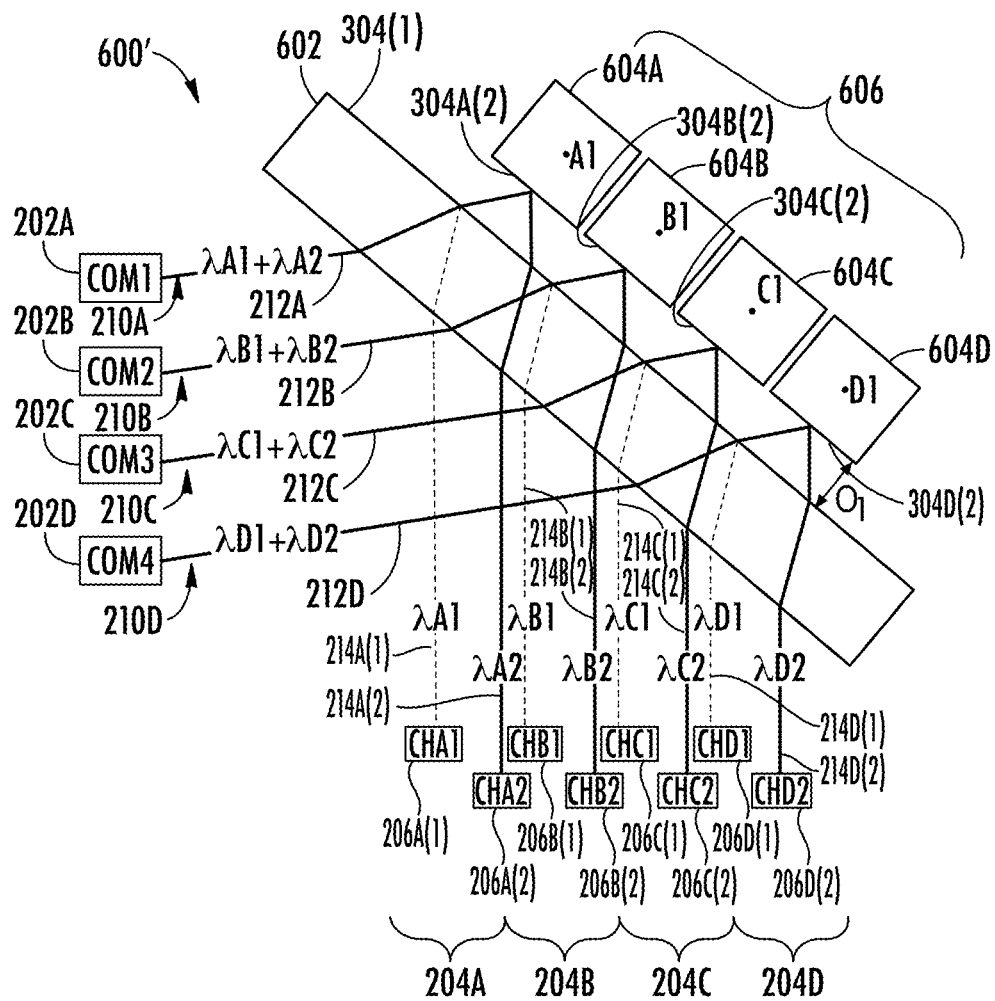
FIG. 6B is a top view of another embodiment of the WDM assembly of FIG. 6A with the first routing surface at a back of a first WDM filter and a plurality of second routing surfaces at a front of a plurality of routing components and offset from the back of the first WDM filter.

FIG. 6B is a top view of another embodiment of the WDM assembly 600' of FIG. 6A with the first routing surface 304(1) at a back of a first WDM filter 602. Instead of a single mirror 604, the second routing surface 304(2) includes a plurality of routing surfaces 304A(2)-304D(2) of an array 606 of a plurality of mirrors 604A-604D offset from the first routing surface 304(1) of the first WDM filter 602. In particular, the second routing surface 304(2) includes a primary second routing surface 304A(2) of a primary mirror 604A to reflect the second demultiplexed signal λA2 of the first demultiplexed signal, a secondary second routing surface 304B(2) of a secondary mirror 604B to reflect the second demultiplexed signal λB2 of the second demultiplexed signal, a tertiary second routing surface 304C(2) of a tertiary mirror 604C to reflect the third demultiplexed signal λA3 of the third demultiplexed signal, and a quaternary second routing surface 304D(2) of a quaternary mirror 604D to reflect the fourth demultiplexed signal λA4 of the fourth demultiplexed signal. Each mirror 604A-604D is associated with a different common port 202A-202D. Using individual separate mirrors 604A-604D provides greater control of individual second channel paths 214A(2)-214D(2) as each mirror 604A-604D can be rotated around a respective center axis A1–D1 and/or laterally shifted for fine tuning. In other words, one or more of the second routing surfaces 304A(2)-304D(2) may not be perfectly aligned or parallel with one another. Such a configuration may provide increased freedom of alignment and best optical performance.

Figure 7:
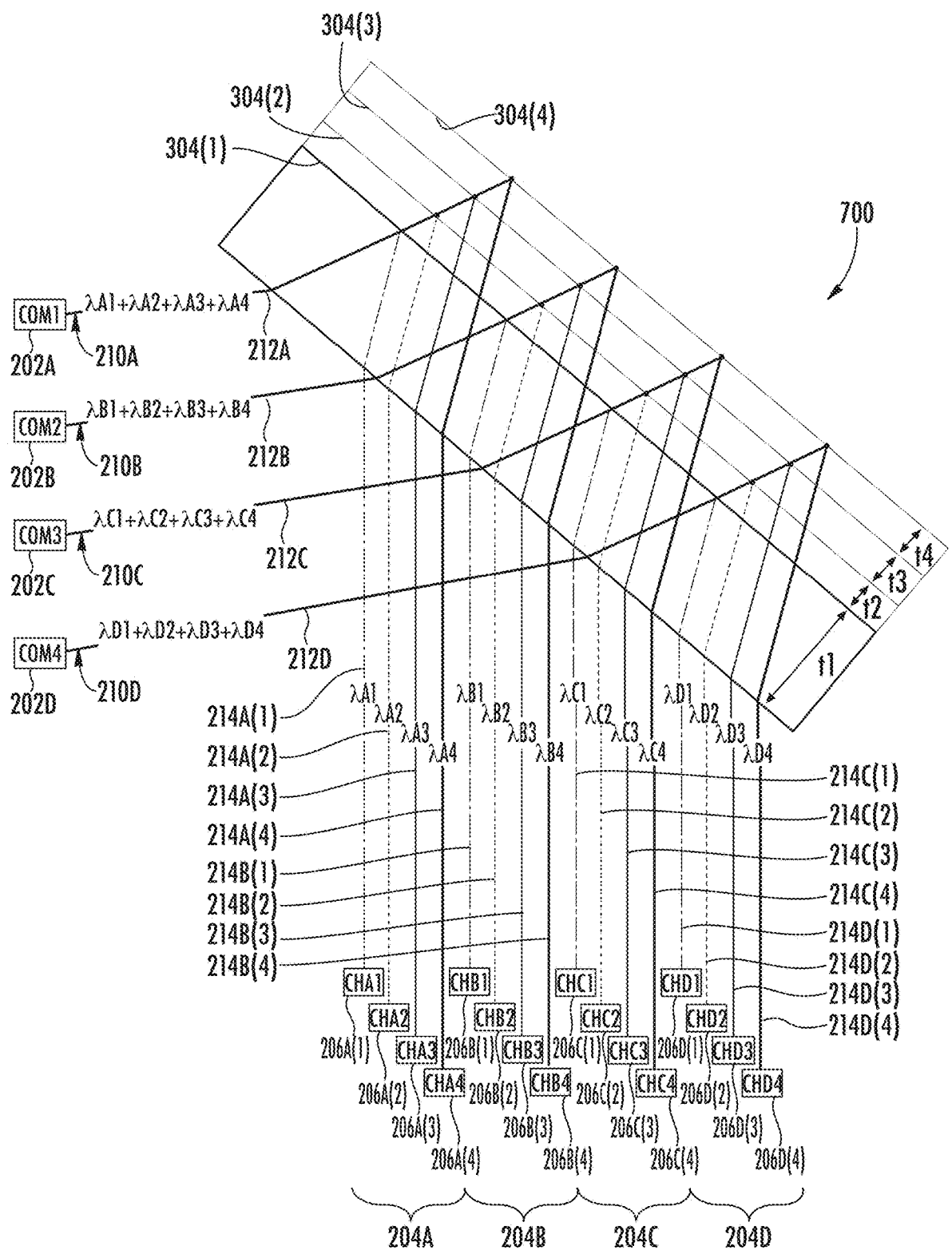
FIG. 7 is a top view of another embodiment of the WDM assembly of FIGS. 2A-6B with routing surfaces in a stacked orientation for routing four multiplexed signals from four common ports to four channel sets, respectively.

FIG. 7 is a top view of another embodiment of the WDM assembly of FIGS. 2A-6B. The WDM assembly 700 includes routing surfaces 304(1)-304(4) in a stacked orientation for routing four multiplexed signals from four common ports 202A-202D to four channel sets 204A-204D respectively. For example, this configuration could incorporate features of the configurations of FIGS. 3A-4D. A WDM assembly 700 with routing surfaces in a stacked orientation may be the easiest and cheapest to manufacture. As shown, the WDM assembly 700 could incorporate additional common ports 202A-202D simply by extending the width of the routing surfaces 304(1)-304(4).

The first common port 202A is configured for optical communication of a first multiplexed signal including demultiplexed signals λA1–λA4. The first WDM common port 202A is configured for optical communication with a first channel set 204A of four WDM channel ports 206A(1)-206A(4). The second WDM common port 202B is configured for optical communication of a second multiplexed signal including demultiplexed signals λB1–λB4. The second WDM common port 202B is configured for optical communication with a second channel set 204B of four WDM channel ports 206B(1)-206B(4). The third WDM common port 202C is configured for optical communication of a third multiplexed signal including demultiplexed signals λC1–λC4. The third WDM common port 202C is configured for optical communication with a third channel set 204C of four WDM channel ports 206C(1)-206C(4). The fourth WDM common port 202D is configured for optical communication of a fourth multiplexed signal including demultiplexed signals λD1–λD4. The fourth WDM common port 202D is configured for optical communication with a fourth channel set 204D of four WDM channel ports 206D(1)-206D(4).

Figure 8A:
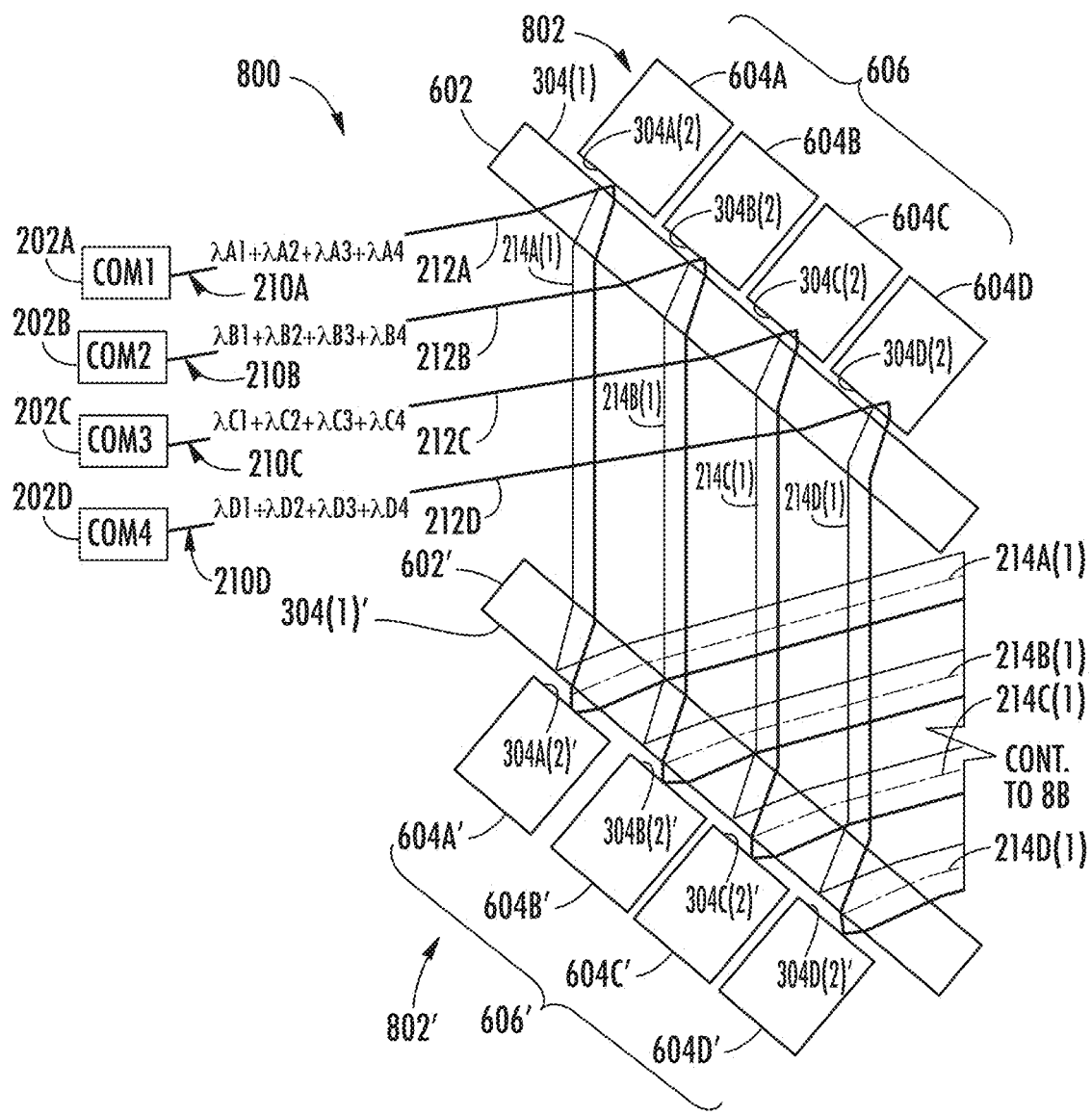
FIGS. 8A and 8B are top views of another embodiment of the WDM assembly of FIGS. 2A-6B with routing surfaces in a cascaded orientation for routing four multiplexed signals from four common ports to four channel sets, respectively.
Figure 8B:
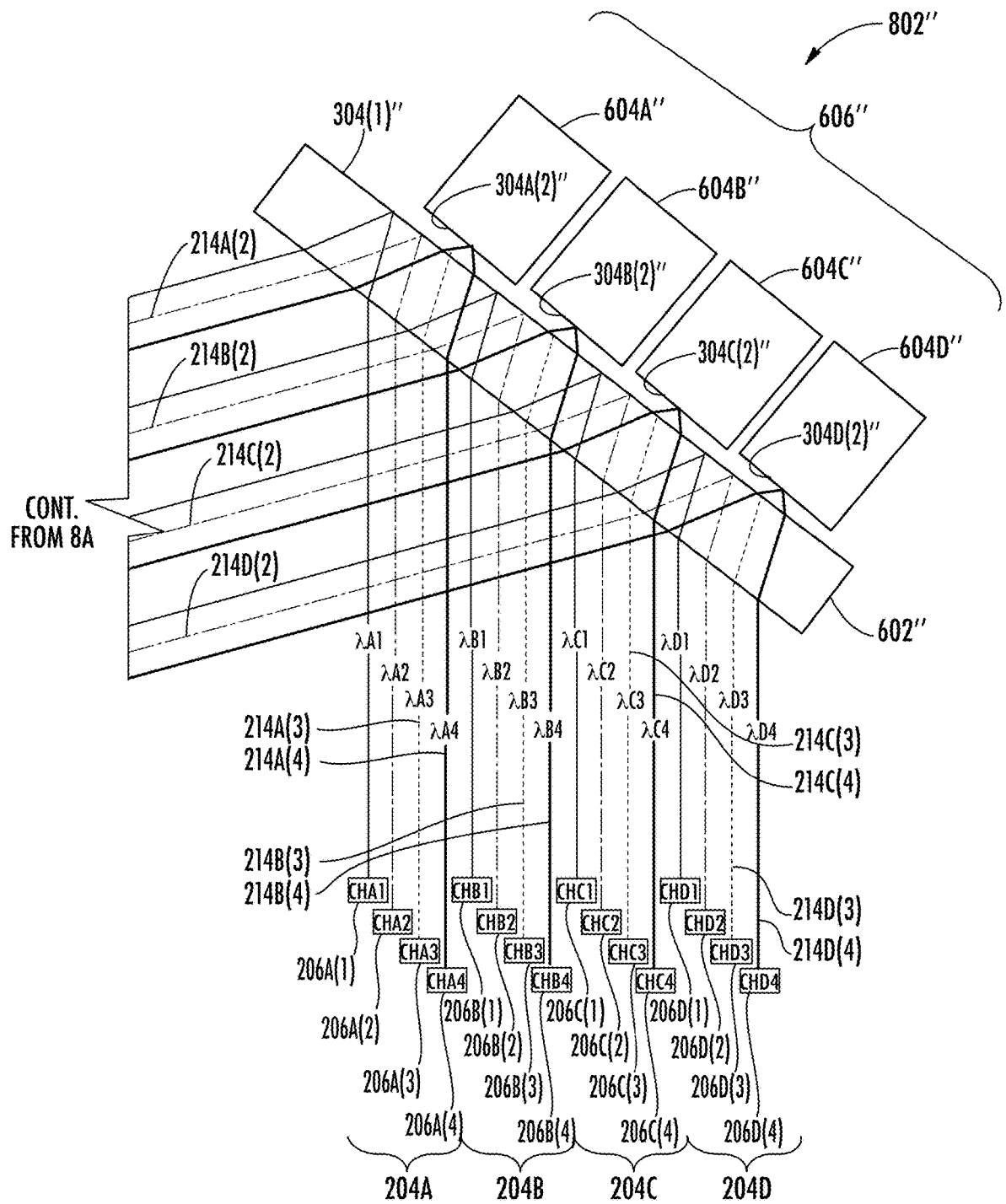

FIGS. 8A and 8B are top views of another embodiment of the WDM assembly of FIGS. 2A-6B. The WDM assembly 800 includes routing surfaces 304(1), 304(1)', 304(1)" in a cascaded orientation for routing four multiplexed signals from four common ports 202A-202D to four channel sets 204A-204D respectively. A WDM assembly 800 with routing surfaces and/or individual second routing surfaces in a cascaded orientation may provide the most flexibility with individualized tuning and the overall best optical performance. As shown, the WDM assembly 800 could incorporate additional common ports 202A-202D simply by extending the width of the routing surfaces 304(1)-304(1)".

The WDM assembly 800 includes three WDM subassemblies 802, 802', 802" configured to demultiplex four signals. As similarly discussed with respect to FIG. 6B, each WDM subassembly 802, 802', 802" includes a WDM filter 602, 602', 602" with a first routing surface 304(1), 304(1)', 304(1)" at a back of the WDM filter 602, 602', 602". Each WDM subassembly 802, 802', 802" includes an array 606, 606', 606" plurality of mirrors 604A-604D, 604A'-604D', 604A"-604D" with a respective second routing surfaces 304A(2)-304D(2), 304A(2)'-304D(2)', 304A(2)'-304D(2)" offset from the first routing surfaces 304(1), 304(1)', 304(1)" of the WDM filters 602, 602', 602".

The first WDM subassembly 802 receives the multiplexed signals from common ports 202A-202D and demultiplexes the first demultiplexed signals λA1–λD1 therefrom. The first routing surface 304(1) of the first WDM subassembly 802 reflects the first demultiplexed signals λA1–λB1. The second routing surface 304A(2)-304D(2) of the first WDM subassembly 802 respectively reflects the second, third, and fourth demultiplexed signals λA2–λD4. The second WDM subassembly 802' receives the demultiplexed signals λA1–λD1 and multiplexed signals λA2–λD4 from the first WDM subassembly 802 and demultiplexes the second demultiplexed signal λA2–λD2 therefrom. The first routing surface 304(1)' of the second WDM subassembly 802' reflects the first demultiplexed signal λA1–λD1 and the second demultiplexed signal λA2–λD2. The second routing surfaces 304A(2)'-304D(2)' of the second WDM subassembly 802' respectively reflect the third and fourth demultiplexed signals λA3–λB4. The third WDM subassembly 802" receives the demultiplexed signals λA1–λD2 and multiplexed signals λA3–λD4 from the second WDM subassembly 802' and demultiplexes the third demultiplexed signal λA3–λD3 therefrom. The first routing surface 304(1)" of the third WDM subassembly 802" reflects the first demultiplexed signal λA1–λD1, the second demultiplexed signal λA2–λB2, and the third demultiplexed signal λA3–λD3. The second routing surfaces 304A(2)"-304D(2)" of the third WDM subassembly 802" respectively reflect the fourth demultiplexed signals λA4–λB4. Thus, the channel sets 204A-204D receive demultiplexed signals λA1–λD4 from the third WDM subassembly 802".

Figure 9:
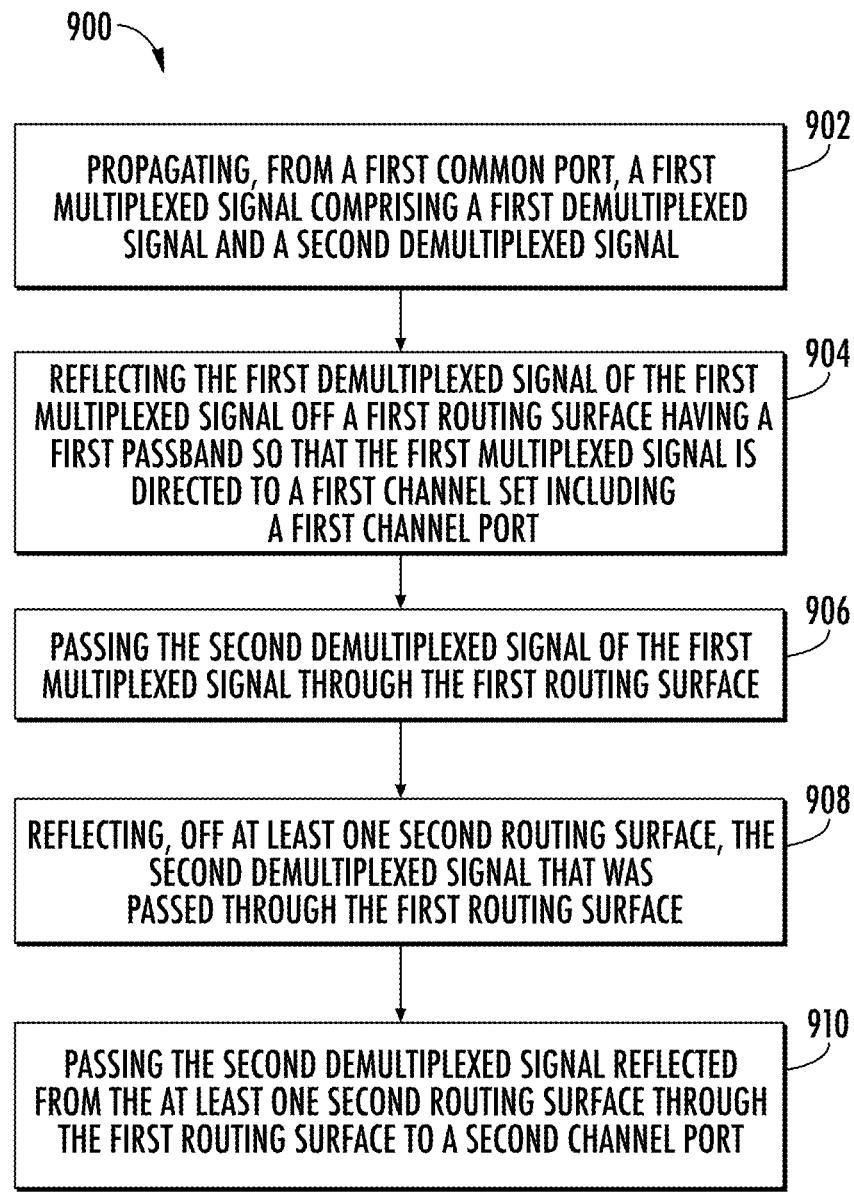
FIG. 9 is a flowchart of steps for using any of the WDM assemblies of FIGS. 2A-8B.

FIG. 9 is a flowchart of steps 900 for using any of the WDM assemblies of FIGS. 2A-8B. Step 902 includes propagating, from a first common port, a first multiplexed signal comprising a first demultiplexed signal and a second demultiplexed signal. Step 904 includes reflecting the first demultiplexed signal of the first multiplexed signal off a first routing surface having a first passband so that the first multiplexed signal is directed to a first channel set including a first channel port. Step 906 includes passing the second demultiplexed signal of the first multiplexed signal through the first routing surface. Step 908 includes reflecting, off at least one second routing surface, the second demultiplexed signal that was passed through the first routing surface. In certain embodiments, the at least one second routing surface comprises a second passband. In certain embodiments, the at least one second routing surface comprises a mirror. Step 910 includes passing the second demultiplexed signal reflected from the at least one second routing surface through the first routing surface to a second channel port.

In certain embodiments, the WDM assembly is in a stacked configuration. Accordingly, in certain embodiments, the method further includes passing a third demultiplexed signal of the first multiplexed signal through the first routing surface. The method further includes passing the third demultiplexed signal through the at least one second routing surface. The method further includes reflecting, off at least one third routing surface, the third demultiplexed signal passed through the first routing surface and the at least one second routing surface. The method further includes passing the third demultiplexed signal of the first multiplexed signal reflected from the at least one third routing surface through the at least one second routing surface and the at least one first routing surface to a third channel port of the first channel set.

In certain embodiments, the WDM assembly is in a cascaded configuration. Accordingly, in certain embodiments, the method further includes reflecting, off the at least one second routing surface, the second demultiplexed signal of the first multiplexed signal and a third demultiplexed signal of the first multiplexed signal. The method further includes reflecting, off at least one third routing surface, the first demultiplexed signal of the first multiplexed signal and the second demultiplexed signal of the first multiplexed signal. The method further includes passing the third demultiplexed signal of the first multiplexed signal through the at least one third routing surface.

In certain embodiments, the WDM assembly includes multiple common ports. Accordingly, in certain embodiments, the method further includes propagating, from a second common port, a second multiplexed signal comprising a first demultiplexed signal and a second demultiplexed signal. The method further includes reflecting the first demultiplexed signal of the second multiplexed signal by the first routing surface having the first passband to a first channel port of a second channel set. The method further includes passing the second demultiplexed signal of the second multiplexed signal through the first routing surface. The method further includes reflecting, off the at least one second routing surface, the second demultiplexed signal of the second multiplexed signal passed through the first routing surface. The method further includes passing the second demultiplexed signal of the second multiplexed signal reflected from the at least one second routing surface through the first routing surface to a second channel port of the second channel set.

As similarly noted above, this method may be used with any number of common ports and/or any number of channels.

Example Micro-Optical Devices and Components

Figure 10:
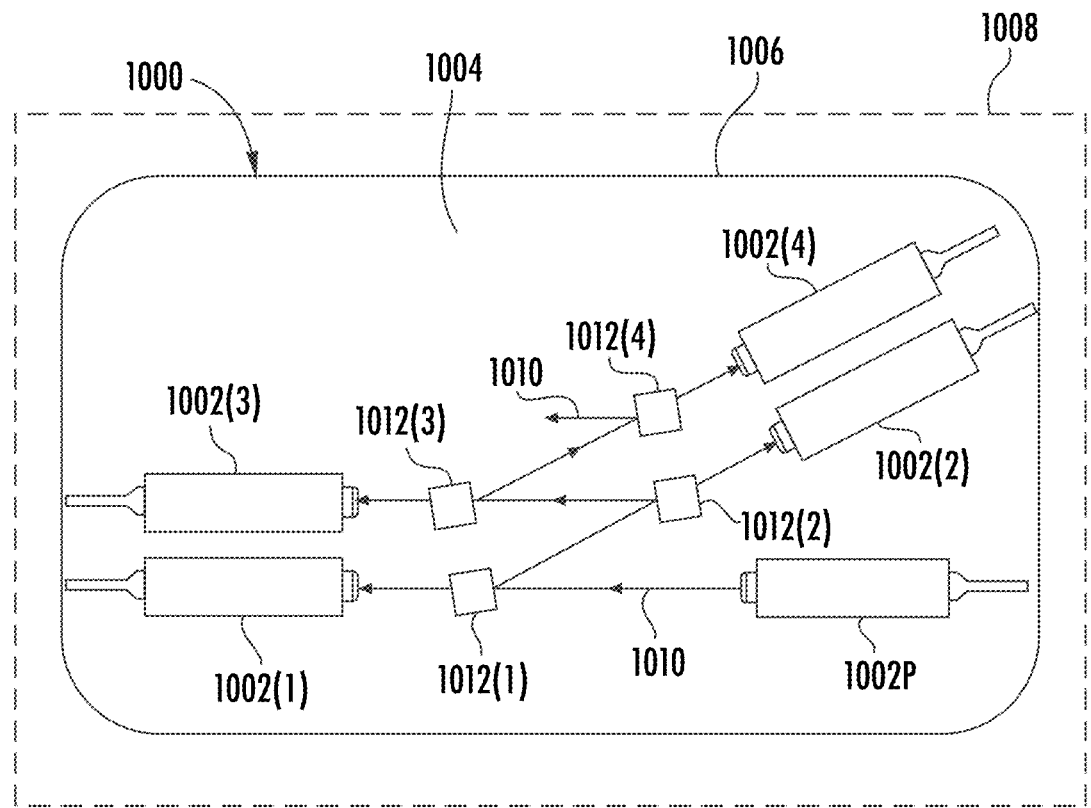
FIG. 10 is a top view of an example micro-optical device used with any of the components and assemblies of FIGS. 2A-8B.

FIG. 10 is a top view of a micro-optical device 1000 that could be used with any of the above embodiments. In general, the micro-optical device 1000 includes at least one micro-collimator 1002 (e.g., collimators 1002P and 1002(1)-1002(4)) supported on an upper surface 1004 of a support substrate 1006. In an example, the micro-optical device 1000 can include a housing 1008 that defines a WDM module. In an example, the WDM module can have a small form factor as defined by length (e.g., in the range of 30 mm to 41 mm), width (e.g., in the range of 14 mm to 28 mm), and height (within the range of 5 mm to 6 mm).

The particular example of micro-optical device 1000 (may also be referred to as a WDM micro-optical device 1000) is in the form of a four-channel WDM device that employs five of the micro-collimators 1002, including common collimator 1002P and channel collimators 1002(1)-1002(4)), in optical communication with each other along an optical signal path 1010 via WDM filters 1012(1)-1012(4). It is noted that a more basic WDM micro-optical device 1000 can employ only three micro-collimators 1002 and is used to separate or combine two wavelengths. Likewise, more complicated WDM micro-optical devices 1000 can employ many more micro-collimators 1002 to separate or combine many more wavelengths besides two wavelengths or even four wavelengths (e.g., tens or even hundreds of different wavelengths). In examples, the WDM channels can be dense WDM (DWDM) channels or coarse WDM (CWDM) channels. Other types of micro-optical devices 1000 besides the WDM micro-optical device described herein can also be formed using the basic techniques described herein. For example, the micro-optical device 1000 can be used to form many types of free-space optical fiber devices, as well as compact variable optical attenuators, switches, optical amplifiers, taps, optical couplers/splitters, optical circulators, optical isolators, optical time-domain reflectometer (OTDRs), etc.

In an example, the support substrate 1006 is made of glass (e.g., quartz) or sapphire. In another example, the support substrate 1006 is made of a glass that is receptive to the formation of glass bumps. In other examples, the support substrate 1006 can be made of stainless steel or silicon, a low-CTE metal alloy (e.g., having a CTE of <10 ppm/° C., or more preferably CTE <5 ppm/° C., or even more preferably CTE <1 ppm/° C.). Examples of metal alloys having such a low CTE include the nickel-iron alloy 64FeNi also known in the art under the registered trademarked INVAR® alloy or the nickel-cobalt ferrous alloy known in the art under the registered trademark KOVAR® alloy. In an example, the upper surface 1004 is precision polished to be flat to within a tolerance of 0.005 mm so that the collimators 1002 can be precision mounted to the upper surface 1004. In an example, the support substrate 1006 includes one or more reference features, such as alignment fiducials, for positioning and/or aligning the micro-collimators 1002 and other optical components (e.g., optical filters, other micro-collimators, etc.).

FIGS. 11-15 are views of example collimators and collimator arrays for use with the components and devices of FIGS. 2A-8B and 10.

Figure 11:
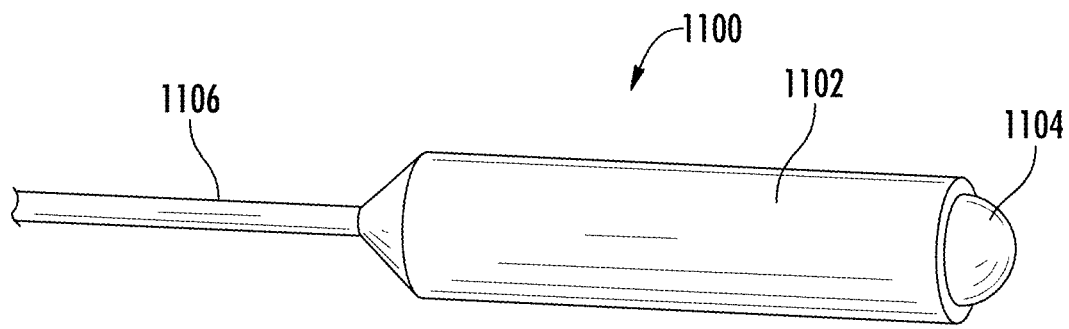
FIG. 11 is a perspective view of an example steel-tube collimator for use with the components and assemblies of FIGS. 2A-8B.

FIG. 11 is a perspective view of an example steel-tube collimator 1100 for use with the components and devices of FIGS. 2A-8B and 10. The collimator 1100 narrows a beam of particles or waves. In other words, the collimator 1100 causes the directions of motion to become more aligned in a specific direction. The steel-tube collimator 1100 includes a steel-tube body 1102, with a curved lens 1104 at one end of the steel-tube body, and a fiber optic pigtail 1106 at an opposite end of the steel-tube body.

Figure 12A:
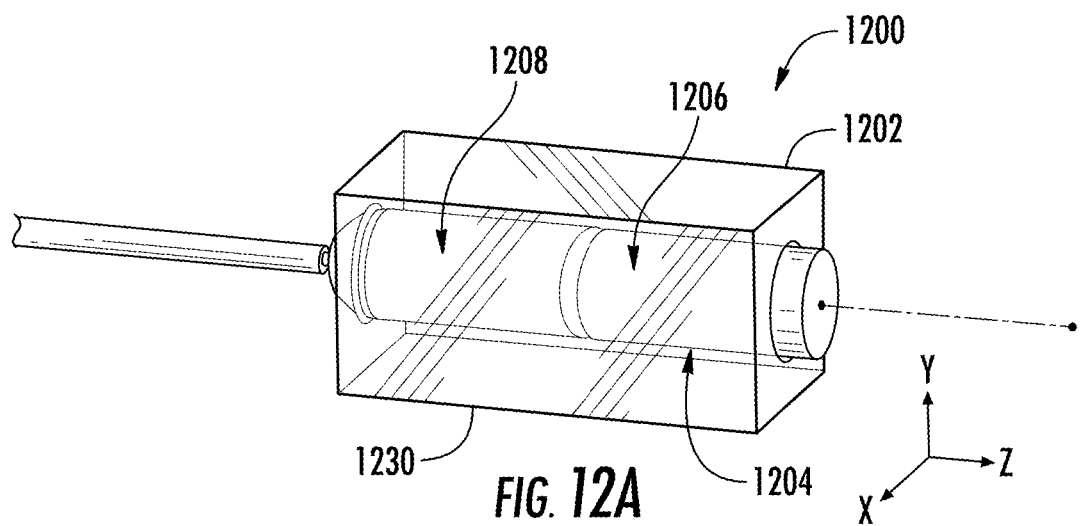
FIG. 12A is a perspective view of an example square tube collimator for use with the components and assemblies of FIGS. 2A-8B.
Figure 12B:
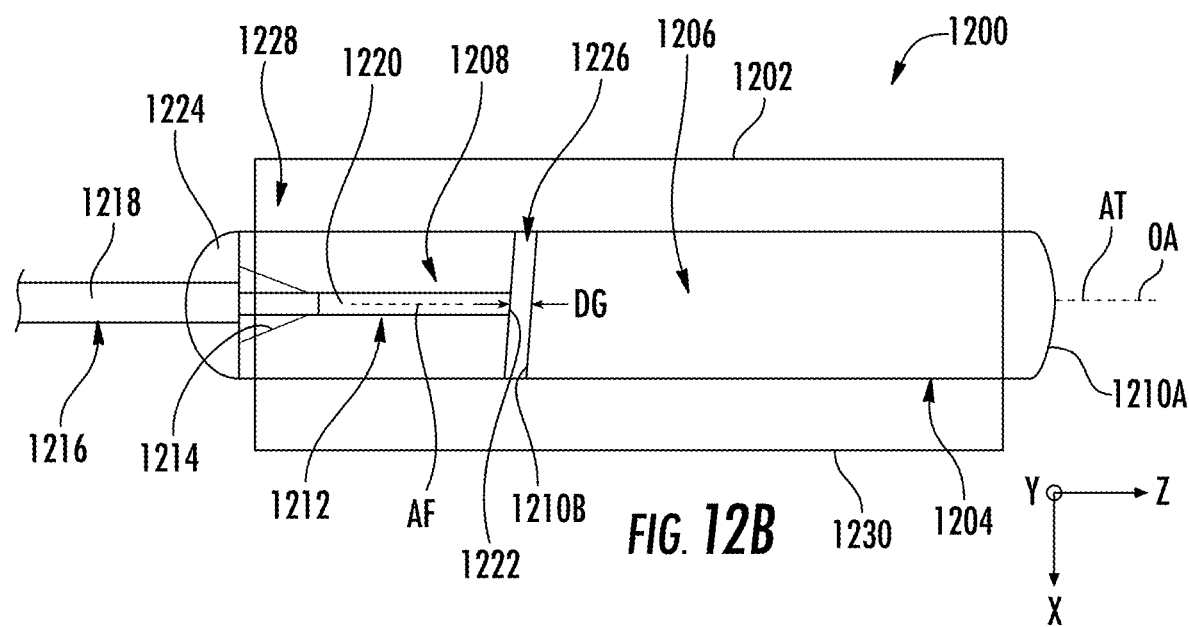
FIG. 12B is a cross-sectional top view of the square tube collimator of FIG. 12A.

FIGS. 12A and 12B are views of an example square tube collimator for use with the components and devices of FIGS. 2A-8B and 10. The square tube collimator 1200 includes a glass tube 1202 (e.g., cylindrical) with a central bore 1204. As used herein, the term "cylindrical" is used in its most general sense and can be defined as a three-dimensional object formed by taking a two-dimensional object and projecting it in a direction perpendicular to its surface. Thus, a cylinder, as the term is used herein, is not limited to having a circular cross-sectional shape but can have any cross-sectional shape, such as the square cross-sectional shape described below by way of example.

The square tube collimator 1200 further includes optical elements, such as a collimating lens 1206, ferrule 1208, etc., which can be secured to the glass tube 1202 using a securing mechanism (e.g., an adhesive). The collimating lens 1206 has a front surface 1210A and a back surface 1210B opposite thereto. In the example shown, the front surface 1210A is convex while the back surface 1210B can be angled, e.g., in the x-z plane as shown. In an example, the front surface 1210A of collimating lens 1206 can reside outside of the central bore 1204, i.e., the front-end portion of the collimating lens 1206 can extend slightly past the front end of the glass tube 1202. In an example, the collimating lens 1206 can be formed as a gradient-index (GRIN) element that has a planar front surface 1210A. In an example, the collimating lens 1206 can consist of a single lens element, while in another example it can consist of multiple lens elements. In the discussion below, the collimating lens 1206 is shown as a single lens element for ease of illustration and discussion.

The optical fiber support member is in the form of a ferrule 1208. The ferrule 1208 includes a central bore 1212 that runs between a front end and a back end along a ferrule central axis AF, which in an example is co-axial with the tube central axis AT of the glass tube 1202 and the optical axis OA as defined by the collimating lens 1206. The central bore 1212 can include a flared portion 1214 at the back end of the ferrule 1208.

An optical fiber 1216 has a coated portion 1218, and an end portion 1220 is bare glass (e.g., is stripped of the coated portion) and is thus referred to as the "bare glass portion." The bare glass portion 1220 includes a polished end face 1222 that defines a proximal end of the optical fiber. The bare glass portion 1220 of the optical fiber 1216 extends into the central bore 1212 of the ferrule 1208 at the back end of the ferrule 1208. A securing element 1224 can be disposed around the optical fiber 1216 at the back end of the ferrule 1208 to secure the optical fiber to the ferrule 1208. The front end of the ferrule 1208 is angled in the x-z plane and is axially spaced apart from the angled back end of the collimating lens to define a gap 1226 that has a corresponding axial gap distance DG. While a glass optical fiber is described above, other types of optical fibers may be used, such as, for example, a plastic optical fiber.

The ferrule 1208, optical fiber 1216, and securing element 1224 constitute a fiber optic pigtail 1228, which can be said to reside at least partially within the bore 1204 adjacent the back end of the glass tube 1202. Thus, in an example, the square tube collimator 1200 includes only the glass tube 1202, the collimating lens 1206, and the fiber optic pigtail 1228. The glass tube 1202 serves in one capacity as a small lens barrel that supports and protects the collimating lens 1206 and the fiber optic pigtail 1228, particularly the bare glass portion 1220 and its polished end face 1222. The glass tube 1202 also serves in another capacity as a mounting member that allows for the square tube collimator 1200 to be mounted to a support substrate. In this capacity, at least one flat surface 1230 serves as a precision mounting surface.

In an example, the glass tube 1202, the collimating lens 1206, and the ferrule 1208 are all made of a glass material, and further in an example, are all made of the same glass material. Making the glass tube 1202, the collimating lens 1206, and the ferrule 1208 out of a glass material has the benefit that these components will have very close if not identical, coefficients of thermal expansion (CTE). This feature is particularly advantageous in environments that can experience large swings in temperature.

In an example, the optical elements used in micro-optical systems are sized to be slightly smaller than the diameter of the bore 1204 (e.g., by a few microns or tens of microns) so that the optical elements can be inserted into the bore 1204 and be movable within the bore 1204 to a select location. In an example, the select location is an axial position where the optical element resides for the micro-optical system to have optimum or substantially optimum optical performance. Here, substantially optimum performance means performance that may not be optimum but that is within a performance or specification for the micro-optical system.

In another example, the optical elements have a clearance with respect to the bore 1204 in the range of a few microns (e.g., 2 microns or 3 microns) to tens of microns (e.g., 20 microns up to 50 microns). A relatively small value for the clearance allows for the optical elements to be well-aligned with the central bore axis AB, e.g., to within a few microns (e.g., from 2 microns to 5 microns).

The optical elements and the support/positioning elements can be inserted into and moved within the bore 1204 to their select locations using micro-positioning devices. The optical elements and the support/positioning elements can be secured within the bore 1204 using a number of securing techniques. One example of a securing technique uses a securing feature that is an adhesive (e.g., a curable epoxy). Another securing technique uses a securing feature that involves a glass soldering to create one or more glass solder points. Another securing technique uses glass welding to create a securing feature in the form of one or more glass welding points. A combination of these securing features can also be employed.

Thus, one or more optical elements can be secured within the bore 1204 using one or more securing features, and can also be supported and/or positioned using one or more support/positioning elements. The non-adhesive securing techniques described below allow for the micro-optical systems disclosed herein to remain free of adhesives so that, for example, micro-optical systems can consist of glass only.

Figure 13A:
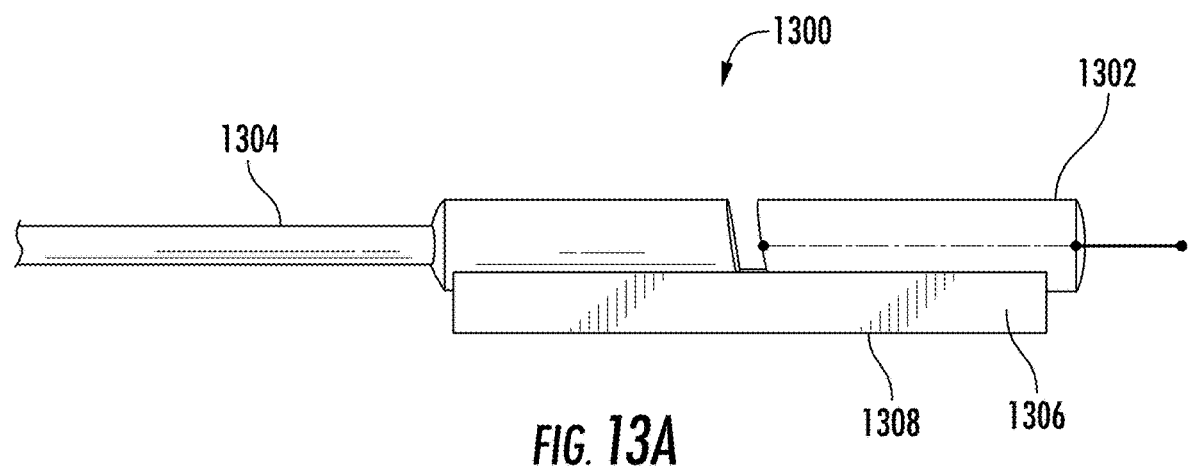
FIG. 13A is a side view of an example compact collimator for use with the components and assemblies of FIGS. 2A-8B.

FIG. 13A is a side view of an example compact collimator for use with the components and devices of FIGS. 2A-8B and 10. A collimator 1300 includes a lens 1302 (e.g., a glass or silica collimating lens), a fiber optic pigtail 1304, and a groove (e.g., a generally V-shaped groove) formed in a base 1306. The lens 1302 and the fiber optic pigtail 1304 are disposed in the groove. The lens 1302 is configured to receive a light signal provided to the WDM multiplexer/demultiplexer from an external optical transmission system or provide a light signal multiplexed or demultiplexed by the WDM to an external optical transmission system. The lens 1302, for example, may be configured to receive a light signal from a fiber optic element for multiplexing or demultiplexing and/or to provide a multiplexed or demultiplexed light signal to an external fiber optic element. The fiber optic pigtail 1304 is optically coupled to the lens 1302 and is configured to provide a light signal to the lens 1302 from the external fiber optic element and/or to receive the light signal from the lens 1302 for transmission to the external fiber optic element.

In various embodiments, the lens 1302 and the fiber optic pigtail 1304 may or may not contact each other. The lens 1302 and the fiber optic pigtail 1304 may be securable to the groove independent of each other to allow for precise adjustment of a pointing angle between an optical beam from the collimator 1300 and a side and/or bottom surface of the groove. In addition, the lens 1302 and fiber optic pigtail 1304 may have the same outer diameter.

The base 1306 of the collimator 1300 has a generally flat bottom surface 1308 for mounting on a substrate of a WDM multiplexer/demultiplexer or other optical system. The base 1306 further includes a width that is less than a width of the lens 1302 and a width of the fiber optic pigtail 1304.

Figure 13B:
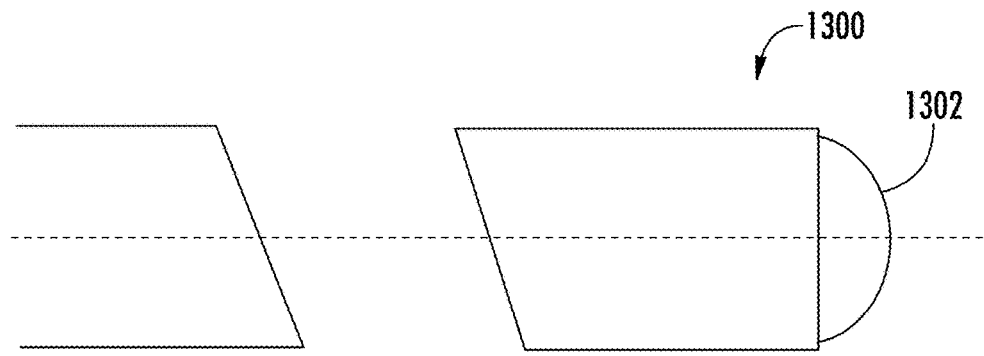
FIG. 13B is a close-up side view of the compact collimator of FIG. 13A.

FIG. 13B is a close-up side view of the compact collimator of FIG. 13A. A pointing angle between an optical beam from a collimator 1300 and the side and bottom surface of the groove can be eliminated (or at least reduced) by controlling the relative position between the lens 1302 and the fiber optic pigtail 1304 (see FIG. 13A) of the collimator 1300. By fine tuning the position of the fiber optic pigtail 1304 to make an outgoing beam come across a focal point of the lens 1302, a collimated zero pointing angled beam with negligible off axis offset can be achieved. In one embodiment, for example, the tuning can be monitored by near field and far field beam position comparison (e.g., using a beam scanner). The zero pointing angle collimating components are easier to attach to the substrate with little inclination, and more reliable bonding is possible due to the uniform epoxy or bonding agent. It is noted that FIG. 13B is a schematic illustration used to illustrate concepts of the description and that the ends of the glass lens and the fiber optic pigtail 1304 may be oriented at other angles, including perpendicular, to the body of the glass lens and the fiber optic pigtail, respectively.

The structures of the collimator 1300 allow for easier modularization and remove redundant degrees of freedom versus designs in which a collimator is coupled and attached to the substrate via external wedges or supports. Thus, the collimator 1300 may reduce the complexity and further increase the device efficiency and process reliability of the overall multiplexer/demultiplexer design.

Figure 14A:
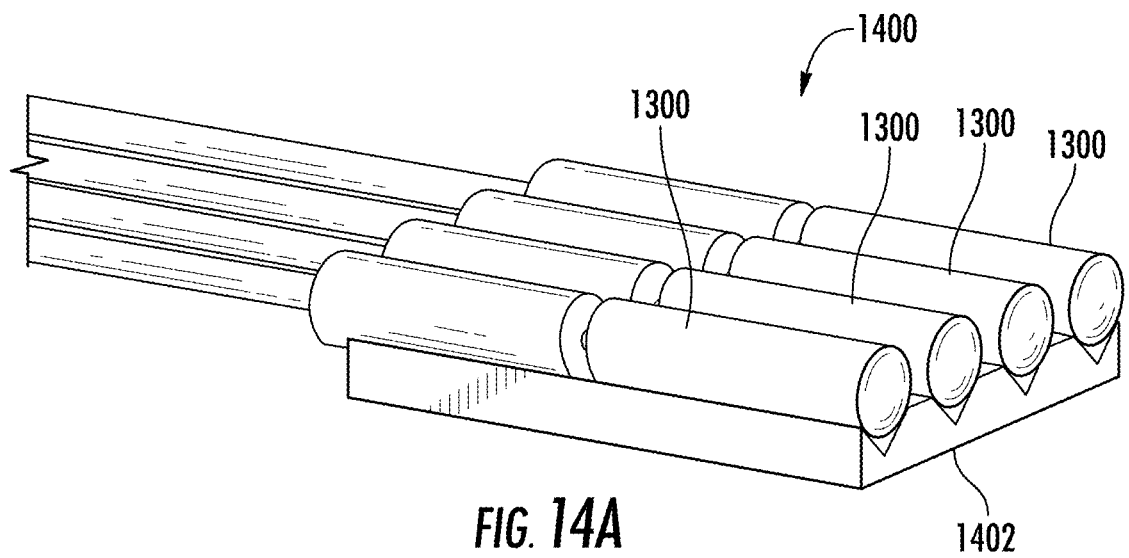
FIG. 14A is a perspective view of an example array of the compact collimators of FIGS. 13A-13B.
Figure 14B:
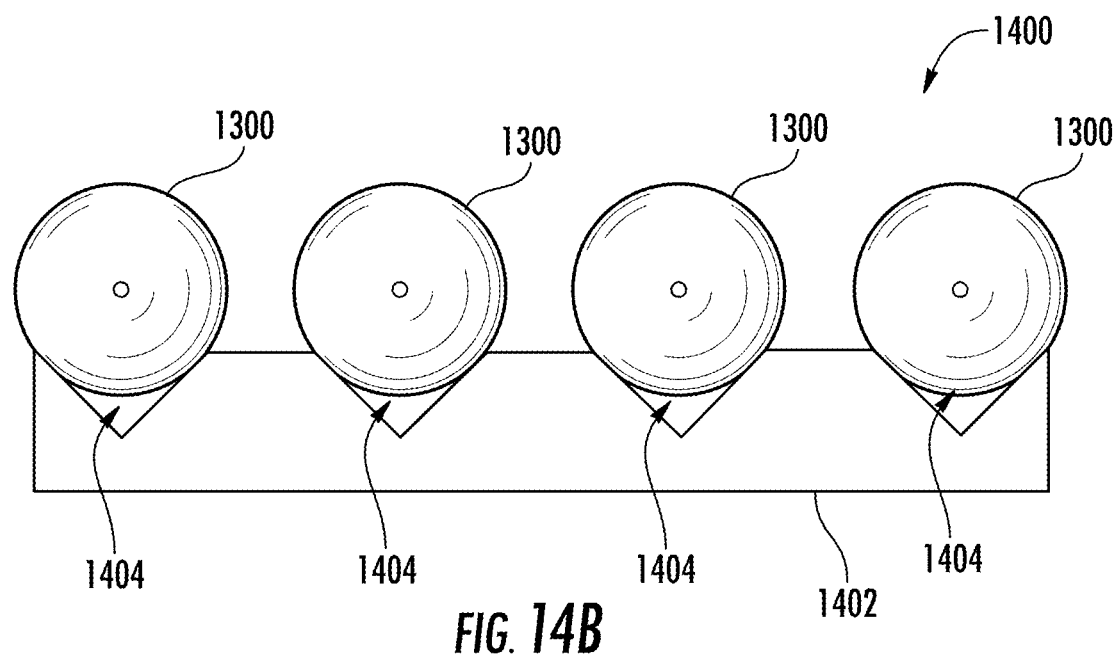
FIG. 14B is a close-up front view of the array of compact collimators of FIG. 14A.

FIGS. 14A-14B are views of an example array 1400 of the collimators 1300 of FIGS. 13A-13B. The collimators 1300 are arranged side-by-side on a surface of a substrate 1402, the substrate 1402 including a plurality of grooves 1404 (discussed above). The grooves 1404 could be v-grooves or any other type of groove. A spacing between the substrate 1402 of the side-by-side collimators 1300 is greater than a spacing between the lenses 1302 (see FIGS. 13A-13B) and fiber optic pigtails 1304 (see FIGS. 14A-14B) of the side-by-side collimators 1300.

Figure 15:
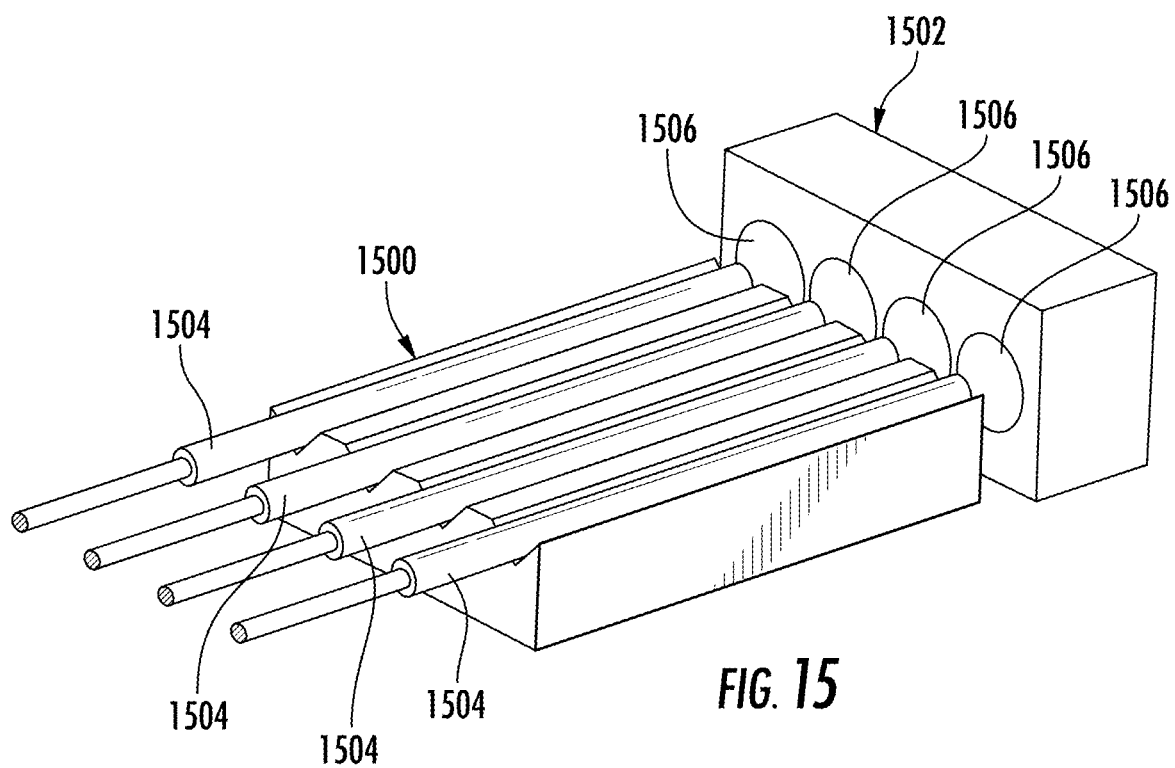
FIG. 15 is a perspective view of an example of a fiber array unit (FAU) for use with the components and assemblies of FIGS. 2A-8B.

FIG. 15 is a perspective view of an example of a fiber array unit (FAU) 1500 and multi-lens array (MLA) 1502 for use with the components and devices of FIGS. 2A-8B and 10. More specifically, the FAU 1500 includes a plurality of fibers 1504, and the MLA 1502 includes a plurality of lenses 1506. The FAU 1500 and MLA 1502 can be used with any of the embodiments discussed above.

It will be apparent to those skilled in the art that various modifications and variations can be made without departing from the spirit or scope of the invention.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Many modifications and other embodiments of the concepts in this disclosure will come to mind to one skilled in the art to which these concepts pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A wavelength-division multiplexing (WDM) assembly, comprising:
    a first common port configured for optical communication of a first multiplexed signal comprising a first signal and a second signal;
    a first channel set including a first channel port configured for optical communication of the first signal and a second channel port configured for optical communication of the second signal;
    a first WDM filter that includes a first routing surface and a first transmissive surface opposite the first routing surface, wherein the first routing surface has a first passband, the first routing surface being configured to reflect the first signal of the first multiplexed signal and pass the second signal of the first multiplexed signal;
    at least one second WDM filter that includes at least one second routing surface and a second transmissive surface opposite the at least one second routing surface, wherein the second transmissive surface is positioned proximate to the first routing surface, and wherein the at least one second routing surface is configured to reflect the second signal of the first multiplexed signal back through the first routing surface;
    wherein the first common port, the first routing surface, the at least one second routing surface, and the second channel port are configured to define an optical signal path,
    wherein the first transmissive surface is positioned in the optical signal path between the first common port and the first routing surface,
    wherein the first routing surface is positioned in the optical signal path between the first common port and the at least one second routing surface, and between the at least one second routing surface and the second channel port, and wherein:

a first thickness of the first WDM filter between the first transmissive surface and the first routing surface is greater than a second thickness of the at least one second WDM filter between the second transmissive surface and the at least one second routing surface, and the second thickness of the at least one second WDM filter is configured to define a pitch between signal paths of the first signal and the second signal exiting the first routing surface.

2. The WDM assembly of claim 1, wherein the at least one second routing surface comprises a second passband.

3. The WDM assembly of claim 1, wherein the at least one second routing surface comprises a mirror.

4. The WDM assembly of claim 1, wherein the at least one second routing surface is positioned proximate to and offset from the first routing surface.

5. The WDM assembly of claim 1, wherein:

the first common port is configured for optical communication of the first multiplexed signal comprising the first signal, the second signal, and a third signal;

the WDM assembly further comprises a third channel port configured for optical communication of the third signal;

the at least one second routing surface is further configured to pass the third signal of the first multiplexed signal; and the WDM assembly further comprises at least one third routing surface configured to reflect the third signal of the first multiplexed signal back through the first routing surface.

6. The WDM assembly of claim 1, wherein:

the first common port is configured for optical communication of the first multiplexed signal comprising the first signal, the second signal, and a third signal;

the WDM assembly further comprises a third channel port configured for optical communication of the third signal;

the at least one second routing surface is further configured to reflect the second signal and the third signal of the first multiplexed signal; and the WDM assembly further comprises at least one third routing surface configured to reflect the first signal and the second signal, and pass the third signal of the first multiplexed signal.

7. The WDM assembly of claim 1, further comprising:

a second common port configured for optical communication of a second multiplexed signal comprising a first signal and a second signal; and a second channel set including a first channel port configured for optical communication of the first signal of the second multiplexed signal and a second channel port configured for optical communication of the second signal of the second multiplexed signal;

wherein the first routing surface is further configured to reflect the first signal of the second multiplexed signal and pass the second signal of the second multiplexed signal; and wherein the at least one second routing surface is further configured to reflect the second signal of the second multiplexed signal back through the first routing surface.

8. The WDM assembly of claim 7, wherein:

the at least one second routing surface comprises a primary second routing surface configured to reflect the second signal of the first multiplexed signal, and a secondary second routing surface configured to reflect the second signal of the second multiplexed signal; and the primary second routing surface is separate from the secondary second routing surface.

9. The WDM assembly of claim 1, further comprising:

a housing;

a first common collimator positioned within the housing and defining the first common port;

a first common fiber optic pigtail coupled to the first common collimator and extending from the housing;

a first channel collimator positioned within the housing and defining the first channel port;

a first channel fiber optic pigtail operatively coupled to the first channel collimator and extending from the housing;

a second channel collimator positioned within the housing and defining the second channel port; and a second channel fiber optic pigtail coupled to the second channel collimator and extending from the housing.

10. A method of using a wavelength-division multiplexing (WDM) assembly, comprising:

propagating, from a first common port, a first multiplexed signal comprising a first signal and a second signal;

reflecting the first signal of the first multiplexed signal off a first routing surface having a first passband so that the first signal is directed to a first channel set including a first channel port;

passing the second signal of the first multiplexed signal through the first routing surface;

reflecting, off at least one second routing surface, the second signal that was passed through the first routing surface; and passing the second signal reflected from the at least one second routing surface through the first routing surface to a second channel port;

propagating, from a second common port, a second multiplexed signal comprising a first signal and a second signal;

reflecting the first signal of the second multiplexed signal by the first routing surface having the first passband to a first channel port of a second channel set;

passing the second signal of the second multiplexed signal through the first routing surface;

reflecting, off the at least one second routing surface, the second signal of the second multiplexed signal passed through the first routing surface; and passing the second signal of the second multiplexed signal reflected from the at least one second routing surface through the first routing surface to a second channel port of the second channel set;

reflecting, off at least one third routing surface, the first signal of the first multiplexed signal and the second signal of the first multiplexed signal; and passing the third signal of the first multiplexed signal through the at least one third routing surface.

11. The method of claim 10, wherein the at least one second routing surface comprises a second passband.

12. The method of claim 10, wherein the at least one second routing surface comprises a mirror.

13. The method of claim 10, further comprising:

passing a third signal of the first multiplexed signal through the first routing surface;

passing the third signal through the at least one second routing surface;

reflecting, off at least one third routing surface, the third signal that was passed through the first routing surface and the at least one second routing surface; and passing the third signal reflected from the at least one third routing surface through the at least one second routing surface and the first routing surface to a third channel port of the first channel set.

14. The method of claim 10, further comprising:

reflecting, off the at least one second routing surface, the second signal of the first multiplexed signal and a third signal of the first multiplexed signal;

reflecting, off at least one third routing surface, the first signal of the first multiplexed signal and the second signal of the first multiplexed signal; and passing the third signal of the first multiplexed signal through the at least one third routing surface.

15. A wavelength-division multiplexing (WDM) assembly, comprising:

a first common port configured for optical communication of a first multiplexed signal comprising a first signal, a second signal, a third signal, and a fourth signal;

a first channel set including a first channel port configured for optical communication of the first signal, a second channel port configured for optical communication of the second signal, a third channel port configured for optical communication of the third signal, and a fourth channel port configured for optical communication of the fourth signal;

a first WDM filter that includes a first transmissive surface and a first routing surface opposite the first transmissive surface, wherein the first routing surface has a first passband, the first routing surface being configured to reflect the first signal of the first multiplexed signal and pass the second signal, the third signal, and the fourth signal of the first multiplexed signal;

a second WDM filter that includes a second transmissive surface and a second routing surface opposite the second transmissive surface, wherein the second transmissive surface is positioned proximate to the first routing surface, and wherein the second routing surface has a second passband that is different than the first passband, the second routing surface being configured to reflect the second signal of the first multiplexed signal back through the first routing surface and pass the third signal and the fourth of the first multiplexed signal;

a third WDM filter that includes a third transmissive surface and a third routing surface opposite the third transmissive surface, wherein the third transmissive surface is positioned proximate to the second routing surface, and wherein the third routing surface has a third passband that is different than the first passband and the second passband, the third routing surface being configured to reflect the third signal of the first multiplexed signal back through the second routing surface and the first routing surface and pass the fourth signal of the first multiplexed signal;

a fourth WDM filter that includes a fourth transmissive surface and a fourth routing surface opposite the fourth transmissive surface, wherein the fourth transmissive surface is positioned proximate to the third routing surface, and wherein the fourth routing surface has a fourth passband that is different than the first passband, the second passband and the third passband, the fourth routing surface being configured to reflect the fourth signal of the first multiplexed signal back through the third routing surface, the second routing surface, and the first routing surface;

wherein the first common port, the first routing surface, the second routing surface, the third routing surface, the fourth routing surface, and the first channel set are configured to define an optical signal path, wherein the first WDM filter, the second WDM filter, the third WDM filter, and the fourth WDM filter have a stacked configuration, and wherein:

a first thickness of the first WDM filter between the first transmissive surface and the first routing surface is greater than: (a) a second thickness of the second WDM filter between the second transmissive surface and the second routing surface, (b) a third thickness of the third WDM filter between the third transmissive surface and the third routing surface, and (c) a fourth thickness of the fourth WDM filter between the fourth transmissive surface and the fourth routing surface, the second thickness of the second WDM filter is configured to define a pitch P1 between signal paths of the first signal and the second signal exiting the first routing surface, the third thickness of the third WDM filter is configured to define a pitch P2 between signal paths of the second signal and the third signal exiting the first routing surface, and the fourth thickness of the fourth WDM filter is configured to define a pitch P3 between signal paths of the third signal and the fourth signal exiting the first routing surface.

16. The WDM assembly of claim 15, wherein the second thickness, the third thickness, and the fourth thickness are such that the first pitch P1, the second pitch P2, and the third pitch P3 are substantially the same.

17. The WDM assembly of claim 15, further comprising:

a second common port configured for optical communication of a second multiplexed signal comprising a first signal, a second signal, a third signal, and a fourth signal; and a second channel set including a first channel port configured for optical communication of the first signal of the second multiplexed signal, a second channel port configured for optical communication of the second signal of the second multiplexed signal, a third channel port configured for optical communication of the third signal of the second multiplexed signal, and a fourth channel port configured for optical communication of the fourth signal of the second multiplexed signal;

wherein the first routing surface is further configured to reflect the first signal of the second multiplexed signal and pass the second signal of the second multiplexed signal, the third signal of the second multiplexed signal, and the fourth signal of the second multiplexed signal; and wherein the second routing surface is further configured to reflect the second signal of the second multiplexed signal back through the first routing surface and pass the third signal of the second multiplexed signal and the fourth signal of the second multiplexed signal, and wherein the third routing surface is further configured to reflect the third signal of the second multiplexed signal back through the second routing surface and the first routing surface, the third routing surface also being configured to pass the fourth signal of the second multiplexed signal, and wherein the fourth routing surface is further configured to reflect the fourth signal of the second multiplexed signal back through the third routing surface, the second routing surface, and the first routing surface.

18. The WDM assembly of claim 15, further comprising:

a housing;

a first common collimator positioned within the housing and defining the first common port;

a first channel collimator positioned within the housing and defining the first channel port;

a second channel collimator positioned within the housing and defining the second channel port;

a third channel collimator positioned within the housing and defining the third channel port; and a fourth channel collimator positioned within the housing and defining the fourth channel port.

19. The WDM assembly of claim 18, further comprising:

a first common fiber optic pigtail coupled to the first common collimator and extending from the housing;

a first channel fiber optic pigtail operatively coupled to the first channel collimator and extending from the housing;

a second channel fiber optic pigtail coupled to the second channel collimator and extending from the housing;

a third channel fiber optic pigtail coupled to the third channel collimator and extending from the housing; and a fourth channel fiber optic pigtail coupled to the fourth channel collimator and extending from the housing.

* * * * *